United States Patent
Jeong et al.

(10) Patent No.: US 9,568,792 B2
(45) Date of Patent: Feb. 14, 2017

(54) LIQUID CRYSTAL DISPLAY

(71) Applicant: Samsung Display Co., Ltd., Yongin, Gyeonggi-Do (KR)

(72) Inventors: Youn Hak Jeong, Cheonan-si (KR); Shi Yul Kim, Yongin-si (KR); Bum Ki Baek, Suwon-si (KR); Dong Hee Shin, Cheonan-si (KR); Ho Jun Lee, Cheonan-si (KR); Kyong Sik Choi, Asan-si (KR)

(73) Assignee: Samsung Display Co., Ltd. (KR)

( * ) Notice: Subject to any disclaimer, the term of this patent is extended or adjusted under 35 U.S.C. 154(b) by 257 days.

(21) Appl. No.: 14/171,431

(22) Filed: Feb. 3, 2014

(65) Prior Publication Data

US 2014/0218655 A1 Aug. 7, 2014

(30) Foreign Application Priority Data

Feb. 5, 2013 (KR) .................. 10-2013-0012985

(51) Int. Cl.
  *G02F 1/1362* (2006.01)
  *G02F 1/155* (2006.01)
  *G02F 1/1343* (2006.01)

(52) U.S. Cl.
  CPC .......... *G02F 1/13624* (2013.01); *G02F 1/155* (2013.01); *G02F 2001/134345* (2013.01)

(58) Field of Classification Search
  CPC . G02F 1/13624; G02F 1/134345; G02F 1/155
  See application file for complete search history.

(56) References Cited

U.S. PATENT DOCUMENTS

| | | | |
|---|---|---|---|
| 6,724,359 B2 * | 4/2004 | Yamamoto | G09G 3/3659 349/48 |
| 7,973,870 B2 | 7/2011 | Chung et al. | |
| 8,169,391 B2 | 5/2012 | Lee et al. | |
| 2009/0015741 A1 | 1/2009 | Kim | |
| 2010/0195004 A1 | 8/2010 | Hotelling | |

(Continued)

FOREIGN PATENT DOCUMENTS

| | | |
|---|---|---|
| JP | 2009-169398 | 7/2009 |
| JP | 2012-037890 | 2/2012 |

(Continued)

*Primary Examiner* — Dung Nguyen
(74) *Attorney, Agent, or Firm* — Innovation Counsel LLP

(57) ABSTRACT

A display device includes a gate line and a data line crossing the gate line. The display device further includes a first switching element and a second switching element each connected to the gate line and the data line. The display device further includes a first sub-pixel electrode and a second sub-pixel electrode connected to the first switching element and the second switching element, respectively. The display device further includes a reference voltage line for transmitting a reference voltage, a first portion of the first reference voltage line overlapping a first edge of the first sub-pixel electrode, a second portion of the first reference voltage line overlapping a second edge of the first sub-pixel electrode opposite the first edge of the first sub-pixel electrode. The display device further includes a third switching element connected to the gate line, the first sub-pixel electrode, and the reference voltage line.

18 Claims, 11 Drawing Sheets

(56) References Cited

U.S. PATENT DOCUMENTS

2012/0182508 A1* 7/2012 Lee .................. G02F 1/133707
349/123

FOREIGN PATENT DOCUMENTS

| KR | 10-2005-0053847 | 6/2005 |
| KR | 10-2007-0101549 | 10/2007 |
| KR | 10-2007-0121284 | 12/2007 |
| KR | 10-2009-0054300 | 5/2009 |
| KR | 10-2010-0048265 | 5/2010 |
| KR | 10-2012-0029266 | 3/2012 |

* cited by examiner

LIQUID CRYSTAL DISPLAY

CROSS-REFERENCE TO RELATED APPLICATION

This application claims priority to and the benefit of Korean Patent Application No. 10-2013-0012985 filed in the Korean Intellectual Property Office on Feb. 5, 2013, the entire contents of which are incorporated herein by reference.

BACKGROUND (a) Technical Field

The present invention relates to a liquid crystal display.

(b) Description of the Related Art

A liquid crystal display typically includes two panels with field generating electrodes such as a pixel electrode and a common electrode and typically includes a liquid crystal layer interposed between the panels. The liquid crystal display generates an electric field in a liquid crystal layer by applying voltage to the field generating electrodes to control the orientation of liquid crystal molecules of the liquid crystal layer, thereby controlling polarization of incident light through the generated electric field and displaying desired images.

A vertically aligned (VA) mode liquid crystal display, wherein long axes of liquid crystal molecules are substantially vertical to display panels when electric fields are not applied, may have a relatively large contrast ratio and a relatively wide standard viewing angle. Herein, the standard viewing angle means a viewing angle where a contrast ratio is 1:10 or a luminance reverse critical angle between grays.

In a VA mode liquid crystal display, one pixel may include two subpixels, and different voltages may be applied to the two subpixels to make transmittances thereof different, so that lateral surface visibility may approximate front surface visibility.

Nevertheless, the configuration with two subpixels and with different voltages applied to the two subpixels may cause undesirably high luminance of the lateral surface at a low gray as compared to the front surface, and therefore it may be difficult to express a precise gray in a low gray region. In addition, the total luminance supported by the applied pixel voltage may be undesirably low, and therefore the driving efficiency of the display device may be undesirable.

In a VA mode liquid crystal display, if the pixel electrode and a signal line overlap each other, when polarity of the voltage applied to the signal line is reversed, the voltage of the pixel electrode may be changed. As a result, display quality may be undesirable.

The above information disclosed in this Background section is for enhancement of understanding of the background of the invention. The Background section may contain information that does not belong to the prior art.

SUMMARY

One or more embodiments of the present invention may be related to a liquid crystal display that can set lateral surface visibility to approximate front surface visibility, provide a suitable grayscale in a low gray region, provide satisfactory luminance, and/or prevent an undesirable change in voltage of a pixel electrode.

One or more embodiments of the present invention may be related to a display that that may include a first gate line configured to transmit a first gate signal. The display device may further include a first data line crossing the first gate line in a plan view of the display device and configured to transmit a first data voltage. The display device may further include a first switching element electrically connected to the first gate line and the first data line. The display device may further include a second switching element electrically connected to the first gate line and the first data line. The display device may further include a first sub-pixel electrode electrically connected to the first switching element. The display device may further include a second sub-pixel electrode electrically connected to the second switching element. The display device may further include a first reference voltage line configured to transmit a first reference voltage, a first portion of the first reference voltage line overlapping a first edge of the first sub-pixel electrode, a second portion of the first reference voltage line overlapping a second edge of the first sub-pixel electrode, the first edge of the first sub-pixel electrode being opposite the second edge of the first sub-pixel electrode. The display device may further include a third switching element electrically connected to the first gate line, the first sub-pixel electrode, and the first reference voltage line.

In one or more embodiments, the display device may include a second reference voltage line configured to transmit a second reference voltage, a first portion of the second reference voltage line overlapping the first edge of the first sub-pixel electrode and being spaced from the first portion of the first reference voltage line, a second portion of the second reference voltage line overlapping the second edge of the first sub-pixel electrode and being spaced from the second portion of the first reference voltage line.

In one or more embodiments, the display device may include the following elements: a second gate line configured to transmit a second gate signal; a second data line crossing both the first gate line and the second gate line in a plan view of the display device and configured to transmit a second data voltage; a fourth switching element electrically connected to the second gate line and the second data line; a third sub-pixel electrically connected to the fourth switching element; and a fifth switching element electrically connected to the second gate line, the third sub-pixel electrode, and the second reference voltage line, wherein a third portion of the second reference voltage line overlaps a first edge of the third sub-pixel electrode, wherein a fourth portion of the second reference voltage line overlaps a second edge of the third sub-pixel electrode, and wherein the first edge of the third sub-pixel electrode is opposite the second edge of the third sub-pixel electrode.

In one or more embodiments, the display device may include the following elements: a second data line crossing the first gate line in a plan view of the display device and configured to transmit a second data voltage; a fourth switching element electrically connected to the first gate line and the second data line; a third sub-pixel electrically connected to the fourth switching element; and a fifth switching element electrically connected to the first gate line, the third sub-pixel electrode, and the second reference voltage line, wherein a third portion of the second reference voltage line overlaps a first edge of the third sub-pixel electrode, wherein a fourth portion of the second reference voltage line overlaps a second edge of the third sub-pixel electrode, and wherein the first edge of the third sub-pixel electrode is opposite the second edge of the third sub-pixel electrode.

In one or more embodiments, the second portion of the first reference voltage line and the third portion of the second reference voltage line are disposed between the first portion of the first reference voltage line and the fourth portion of the second reference voltage line, and the second portion of the first reference voltage line is disposed between the first portion of the first reference voltage line and the third portion of the second reference voltage line.

In one or more embodiments, an overlapping area of the first reference voltage line and the first sub-pixel electrode is equal to an overlapping area of the second reference voltage line and the first sub-pixel electrode.

In one or more embodiments, an overlapping area of the first sub-pixel electrode and both the first portion the first reference voltage line and the second portion of the first reference voltage line is equal to an overlapping area of the first sub-pixel electrode and both the first portion the second reference voltage line and the second portion of the second reference voltage line.

In one or more embodiments, each of a third portion of the first reference voltage line and a third portion of the second reference voltage line overlaps a first edge of the second sub-pixel electrode, each of a fourth portion of the first reference voltage line and a fourth portion of the second reference voltage line overlaps a second edge of the second sub-pixel electrode, and the first edge of the second sub-pixel electrode is opposite the second edge of the second sub-pixel electrode.

In one or more embodiments, the first portion of the first reference voltage line is connected to the second portion of the first reference voltage line through a fifth portion of the first reference voltage line, and the fifth portion of the first reference voltage line overlaps a central portion of the first sub-pixel electrode such that the fifth portion of the first reference voltage line divides the first sub-pixel electrode into two substantially equal halves in the plan view of the display device.

In one or more embodiments, the first portion of the second reference voltage line is connected to the second portion of the second reference voltage line through a fifth portion of the second reference voltage line, and the fifth portion of the second reference voltage line overlaps a third edge of the first sub-pixel electrode.

In one or more embodiments, the third portion of the first reference voltage line is connected to the fourth portion of the first reference voltage line through a sixth portion of the first reference voltage line, and the sixth portion of the first reference voltage line overlaps a third edge of the second sub-pixel electrode.

In one or more embodiments, the first portion of the first reference voltage line is connected to the second portion of the first reference voltage line through a fifth portion of the first reference voltage line, and the fifth portion of the first reference voltage line overlaps a third edge of the first sub-pixel electrode.

In one or more embodiments, the first portion of the second reference voltage line is connected to the second portion of the second reference voltage line through a fifth portion of the second reference voltage line, and the fifth portion of the second reference voltage line overlaps a fourth edge of the first sub-pixel electrode.

In one or more embodiments, each of the first portion of the first reference voltage line and the first portion of the second reference voltage line is parallel to the first data line.

In one or more embodiments, each of the first portion of the first reference voltage line and the first portion of the second reference voltage line is parallel to the first gate line.

In one or more embodiments, the display device may include a first auxiliary member electrically connected to the second reference voltage line through a first contact hole and overlapping the first sub-pixel electrode, wherein an overlapping area of the first sub-pixel electrode and the first reference voltage line is substantially equal to an overlapping area of the first sub-pixel electrode and both the second reference voltage line and the first auxiliary member.

In one or more embodiments, the display device may include a second auxiliary member electrically connected to the second reference voltage line through a second contact hole and overlapping the second sub-pixel electrode, wherein an overlapping area of the second sub-pixel electrode and the first reference voltage line is substantially equal to an overlapping area of the second sub-pixel electrode and both the second reference voltage line and the second auxiliary member.

In one or more embodiments, the display device may include the following elements: a common electrode configured to receive a common voltage; and a liquid crystal layer disposed between the common electrode and the first sub-pixel electrode, wherein a polarity of the first reference voltage with respect to the common voltage in a first frame is opposite a polarity of the second reference voltage with respect to the common voltage in the first frame.

In one or more embodiments, the polarity of the first reference voltage with respect to the common voltage in the first frame is different from a polarity of the first reference voltage with respect to the common voltage in a second frame.

In one or more embodiments, the display device may include the following elements: a common electrode configured to receive a common voltage; and a liquid crystal layer disposed between the common electrode and the first sub-pixel electrode, wherein a polarity of the first reference voltage with respect to the common voltage is same as a polarity of the first data voltage with respect to the common voltage.

In one or more embodiments, a magnitude difference between the first reference voltage and the common voltage is greater than a magnitude difference between the first data voltage and the common voltage.

One or more embodiments of the present invention may be related to a liquid crystal display that may include the following elements: a first substrate, a first gate line disposed on the first substrate, a data line disposed on the first substrate, a first reference voltage line disposed on the first substrate, including a first horizontal portion and two first vertical portions connected to the first horizontal portion, and applying a first voltage, a second reference voltage line disposed on the first substrate, including a second horizontal portion and two second vertical portions connected to the first horizontal portion, and applying a second voltage, a first sub-pixel electrode and a second sub-pixel electrode disposed in one pixel region, a first switching element connected to the first gate line, the data line, and the first sub-pixel electrode, a second switching element connected to the first gate line, the data line, and the second sub-pixel electrode, and a third switching element connected to any one of the first gate line, the first reference voltage line, and the second reference voltage line, and the first sub-pixel electrode, in which the two first vertical portions are disposed to be adjacent to both edges of the first sub-pixel electrode, the two second vertical portions are disposed to be adjacent to both edges of the first sub-pixel electrode, and the first vertical portions and the second vertical portions are spaced apart from each other.

An overlapping area of the first sub-pixel electrode and the first vertical portion may be almost the same as the overlapping area of the first sub-pixel electrode and the second vertical portion.

The first reference voltage line may further include two third vertical portions disposed to be adjacent to both edges of the second sub-pixel electrode, and the second reference voltage line may further include two fourth vertical portions disposed to be adjacent to both edges of the second sub-pixel electrode.

An overlapping area of the first sub-pixel electrode and the third vertical portion may be almost the same as the overlapping area of the second sub-pixel electrode and the fourth vertical portion.

The first reference voltage line may include the first horizontal portion connecting the two first vertical portions, and the first horizontal portion may be disposed to be adjacent to a horizontal central portion of the first sub-pixel electrode, or disposed to be adjacent to an upper edge or a lower edge of the first sub-pixel electrode.

The second reference voltage line may include the second horizontal portion connecting the two second vertical portions, and the second horizontal portion may be disposed to be adjacent to the upper edge or the lower edge of the first sub-pixel electrode, or disposed to be adjacent to the horizontal central portion of the first sub-pixel electrode.

The first reference voltage line may include the third horizontal portion connecting the two third vertical portions, and the third horizontal portion may be disposed to be adjacent to a horizontal central portion of the second sub-pixel electrode, or disposed to be adjacent to an upper edge or a lower edge of the second sub-pixel electrode.

The second reference voltage line may include the fourth horizontal portion connecting the two fourth vertical portions, and the fourth horizontal portion may be disposed to be adjacent to the upper edge or the lower edge of the second sub-pixel electrode, or disposed to be adjacent to the horizontal central portion of the second sub-pixel electrode.

An overlapping area of the first sub-pixel electrode and the first horizontal portion may be almost the same as the overlapping area of the first sub-pixel electrode and the second horizontal portion, and the overlapping area of the second sub-pixel electrode and the third horizontal portion may be almost the same as the overlapping area of the second sub-pixel electrode and the fourth horizontal portion.

An overlapping area of the first sub-pixel electrode and the first horizontal portion may be almost the same as the overlapping area of the first sub-pixel electrode and the second horizontal portion.

A data voltage applied to the data line, and a first voltage or a second voltage applied to any one of the first reference voltage line and the second reference voltage line connected to the third switching element may have the same polarity to a common voltage.

The first voltage or the second voltage may have a predetermined magnitude and polarity changed for each frame.

A voltage difference between the first sub-pixel electrode and a common electrode may be larger than the voltage difference between the second sub-pixel electrode and the common electrode.

One or more embodiments of the present invention may be related to a liquid crystal display that may include the following elements: a first substrate, a first gate line disposed on the first substrate, a data line disposed on the first substrate, a first reference voltage line disposed on the first substrate and applying a first voltage, a second reference voltage line disposed on the first substrate and applying a second voltage, a first sub-pixel electrode and a second sub-pixel electrode disposed in one pixel region, a first switching element connected to the first gate line, the data line, and the first sub-pixel electrode, a second switching element connected to the first gate line, the data line, and the second sub-pixel electrode, a third switching element connected to any one of the first gate line, the first reference voltage line, and the second reference voltage line, and the first sub-pixel electrode, and a first auxiliary member connected to the second reference voltage line and overlapping the first sub-pixel electrode, in which an overlapping area of the first sub-pixel electrode and the first reference voltage line is almost the same as an overlapping area of the first sub-pixel electrode and the second reference voltage line and the first auxiliary member.

The liquid crystal display may further include: a second auxiliary member connected to the second reference voltage line and overlapping the second sub-pixel electrode, in which the overlapping area of the second sub-pixel electrode and the first reference voltage line may be almost the same as the overlapping area of the second sub-pixel electrode and the second reference voltage line and the second auxiliary member.

According to embodiments of the present invention, it is possible to set lateral surface visibility to approximate front surface visibility, to provide a suitable grayscale in a low gray region, to prevent luminance from deteriorating in view of an applied driving voltage, and/or to prevent an undesirable change in voltage of a pixel electrode that may be caused by a change in polarity of the voltage applied to a signal line.

DETAILED DESCRIPTION OF THE EMBODIMENTS

Figure 1:
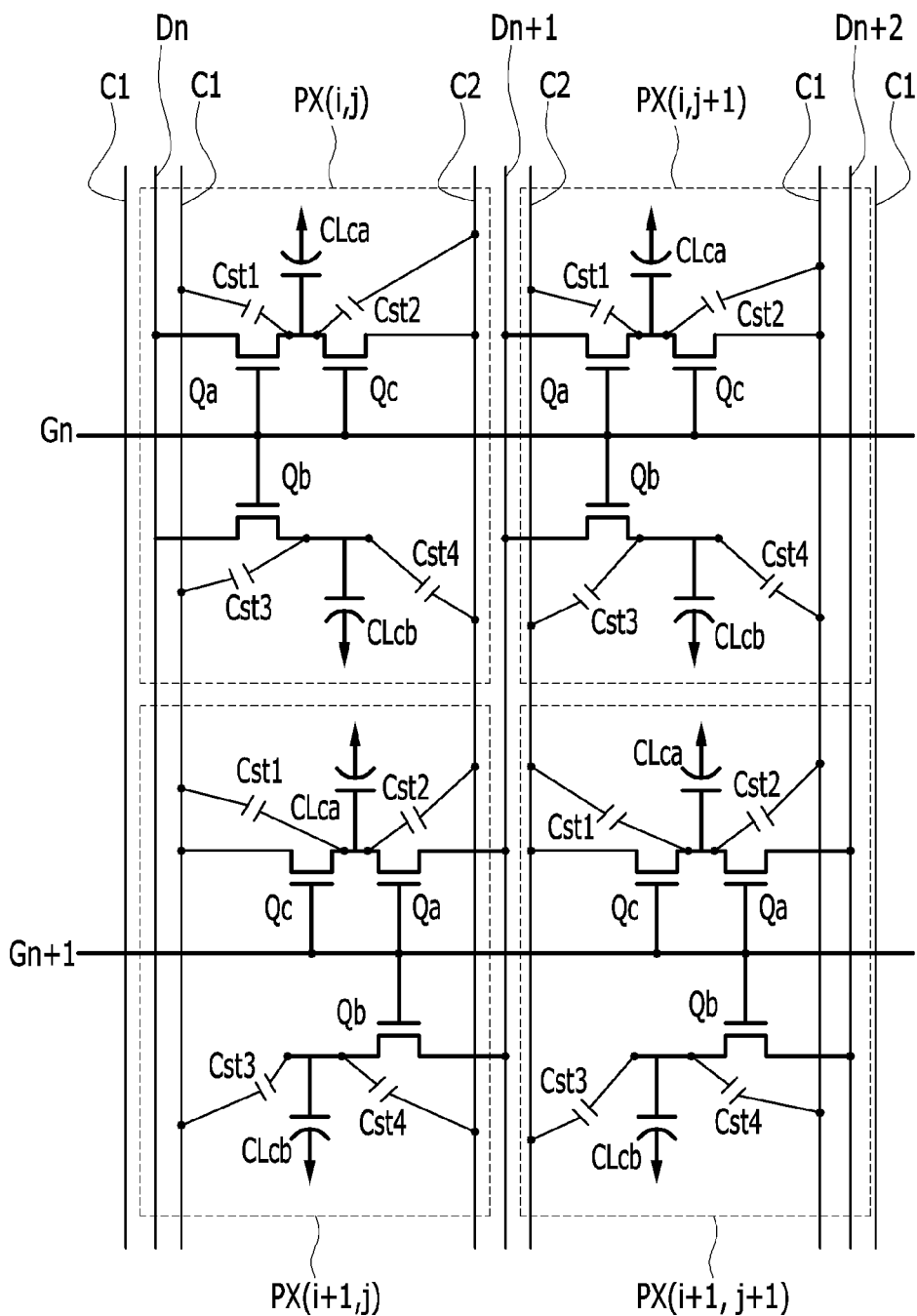
FIG. 1 is an equivalent circuit diagram illustrating four pixels of a liquid crystal display device (or liquid crystal display, for conciseness) according to one or more embodiments of the present invention.

The present invention will be described more fully hereinafter with reference to the accompanying drawings, in which embodiments of the invention are illustrated. As those skilled in the art would realize, the described embodiments may be modified in various different ways, all without departing from the spirit or scope of the present invention.

In the drawings, the thickness of layers, films, panels, regions, etc., may be exaggerated for clarity. Like reference numerals may designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no (intended) intervening elements (except possible environmental elements, such as air) present.

Although the terms first, second, etc. may be used herein to describe various signals, elements, components, regions, layers, and/or sections, these signals, elements, components, regions, layers, and/or sections should not be limited by these terms. These terms may be used to distinguish one signal, element, component, region, layer, or section from another signal, region, layer or section. Thus, a first signal, element, component, region, layer, or section discussed below may be termed a second signal, element, component, region, layer, or section without departing from the teachings of the present invention. The description of an element as a "first" element may not require or imply the presence of a second element or other elements. The terms first, second, etc. may also be used herein to differentiate different categories of elements. For conciseness, the terms first, second, etc. may represent first-type (or first-category), second-type (or second-category), etc., respectively.

In the description, "connected" may mean "electrically connected".

FIG. 1 is an equivalent circuit diagram illustrating four pixels of a liquid crystal display according to one or more embodiments of the present invention.

Referring to FIG. 1, the liquid crystal display includes a first pixel PX(i, j), a second pixel PX(i, j+1), a third pixel PX(i+1, j), a fourth pixel PX(i+1, j+1), and a plurality of signal lines Gn, Gn+1, Dn, Dn+1, Dn+2, C1, and C2 connected to the pixels.

The first pixel PX(i, j) and the second pixel PX(i, j+1) may neighbor each other and may be disposed in a first pixel row. The third pixel PX(i+1, j) and the fourth pixel PX(i+1, j+1) may neighbor each other and may be disposed in a second pixel row. The first pixel PX(i, j) and the third pixel PX(i+1, j) may neighbor each other and may be disposed in a first pixel column. The second pixel PX(i, j+1) and the fourth pixel PX(i+1, j+1) may neighbor each other and may be disposed in a second pixel column.

The signal lines Gn, Gn+1, Dn, Dn+1, Dn+2, C1, and C2 include a plurality of gate lines Gn and Gn+1 for transferring gate signals (also referred to as "scanning signals"), a plurality of data lines Dn, Dn+1, and Dn+2 for transferring data voltages, and a plurality of pairs of reference voltage lines C1 and C2 for transferring at least a predetermined reference voltage. The reference voltage lines C1 and C2 may include a first reference voltage line C1 and a second reference voltage line C2 for transferring reference voltages having different polarities. A first reference voltage and a second reference voltage having a predetermined magnitude are applied to the first reference voltage line C1 and the second reference voltage line C2, respectively, and polarities of the first reference voltage and the second reference voltage may be changed for each frame. In one or more embodiments, the magnitude of a common voltage may be about 7.5 V, the first reference voltage may have a value of about 15 V for a first frame and a value of about 0 V for a second frame, and the second reference voltage may have a value of about 0 V for the first frame and a value of about 15 V for the second frame. The first reference voltage and the second reference voltage may be larger or smaller than a maximum value of the data voltages. In one or more embodiments, a value difference between the first reference voltage and the common voltage when the first reference voltage has a positive polarity with respect to the common voltage may be different from a value difference between the first reference voltage and the common voltage when the first reference voltage has a negative polarity with respect to the common voltage. In one or more embodiments, a value difference between the second reference voltage and the common voltage when the second reference voltage has a positive polarity with respect to the common voltage may be different from a value difference between the second reference voltage and the common voltage when the second reference voltage has a negative polarity with respect to the common voltage.

As illustrated in FIG. 1, a pair of reference voltage lines C1 and C2 associated with the first pixel column may mirror a pair of reference voltage lines C1 and C2 associated with the second pixel column.

The first pixel PX(i, j), which is connected to the first gate line Gn, the first data line Dn, the first reference voltage line C1 associated with the first pixel column, and the second reference voltage line C2 associated with the first pixel column, may include a first switching element Qa, a second switching element Qb, a third switching element Qc, a first liquid crystal capacitor Clca, a second liquid crystal capacitor Clcb, a first storage capacitor Cst1, a second storage capacitor Cst2, a third storage capacitor Cst3, and a fourth storage capacitor Cst4.

Each of the first switching element Qa and the second switching element Qb is connected to both the first gate line Gn and the first data line Dn. The third switching element Qc is connected to the first gate line Gn, the second reference voltage line C2 associated with the first pixel column, and an output terminal of the first switching element Qa.

Each of the first switching element Qa and the second switching element Qb may be a three terminal element (such as a thin film transistor) that has a control terminal connected to the first gate line Gn and has an input terminal connected to the first data line Dn. The output terminal of the first switching element Qa is connected to the first liquid crystal capacitor Clca and the output terminal of the third switching element Qc. The output terminal of the second switching element Qb is connected to the second liquid crystal capacitor Clcb.

The third switching element Qc may be a three terminal element (such as a thin film transistor) that has a control terminal connected to the first gate line Gn, an input terminal connected to the second reference voltage line C2, and an output terminal connected to the first liquid crystal capacitor Clca.

The first storage capacitor Cst1 is connected to the output terminal of the first switching element Qa and the first reference voltage line C1 associated with the first pixel column. The second storage capacitor Cst2 is connected to the output terminal of the first switching element Qa and the second reference voltage line C2 associated with the first pixel column. The third storage capacitor Cst3 is connected to the output terminal of the second switching element Qb and the first reference voltage line C1 associated with the first pixel column. The fourth storage capacitor Cst4 is connected to the output terminal of the second switching element Qb and the second reference voltage line C2 associated with the first pixel column.

The second pixel PX(i, j+1), which is connected to the first gate line Gn, the second data line Dn+1, the first reference voltage line C1 associated with the second pixel column, and the second reference voltage line C2 associated with the second pixel column, may include a first switching element Qa, a second switching element Qb, a third switching element Qc, a first liquid crystal capacitor Clca, a second liquid crystal capacitor Clcb, a first storage capacitor Cst1, a second storage capacitor Cst2, a third storage capacitor Cst3, and a fourth storage capacitor Cst4.

For the first switching element Qa and the second switching element Qb of the second pixel PX(i, j+1), the control terminals are each connected to the first gate line Gn, and the input terminals are each connected to the second data line Dn+1.

For the second pixel PX(i, j+1), the output terminal of the first switching element Qa is connected to the first liquid crystal capacitor Clca and the output terminal of the third switching element Qc; the output terminal of the second switching element Qb is connected to the second liquid crystal capacitor Clcb.

For the third switching element Qc of the second pixel PX(i, j+1), the control terminal is connected to the first gate line Gn, the input terminal is connected to the first reference voltage line C1 associated with the second pixel column, and the output terminal is connected to the first liquid crystal capacitor Clca.

For the second pixel PX(i, j+1), the first storage capacitor Cst1 is connected to the output terminal of the first switching element Qa and the second reference voltage line C2 associated with the second pixel column; the second storage capacitor Cst2 is connected to the output terminal of the first switching element Qa and the first reference voltage line C1 associated with the second pixel column; the third storage capacitor Cst3 is connected to the output terminal of the second switching element Qb and the second reference voltage line C2 associated with the second pixel column; the fourth storage capacitor Cst4 is connected to the output terminal of the second switching element Qb and the first reference voltage line C1 associated with the second pixel column.

The third pixel PX(i+1, j), which is connected to the second gate line Gn+1, the second data line Dn+1, the first reference voltage line C1 associated with the first pixel column, and the second reference voltage line C2 associated with the first pixel column, may include a first switching element Qa, a second switching element Qb, a third switching element Qc, a first liquid crystal capacitor Clca, a second liquid crystal capacitor Clcb, a first storage capacitor Cst1, a second storage capacitor Cst2, a third storage capacitor Cst3, and a fourth storage capacitor Cst4.

For the first switching element Qa and the second switching element Qb of the third pixel PX(i+1, j), the control terminals are each connected to the second gate line Gn+1, and the input terminals are each connected to the second data line Dn+1.

For the third pixel PX(i+1, j), the output terminal of the first switching element Qa is connected to the first liquid crystal capacitor Clca and the output terminal of the third switching element Qc; the output terminal of the second switching element Qb is connected to the second liquid crystal capacitor Clcb.

For the third switching element Qc of the third pixel PX(i+1, j), the control terminal is connected to the second gate line Gn+1, the input terminal is connected to the first reference voltage line C1 associated with the first pixel column, and the output terminal is connected to the first liquid crystal capacitor Clca.

For the third pixel PX(i+1, j), the first storage capacitor Cst1 is connected to the output terminal of the first switching element Qa and the first reference voltage line C1 associated with the first pixel column; the second storage capacitor Cst2 is connected to the output terminal of the first switching element Qa and the second reference voltage line C2 associated with the first pixel column; the third storage capacitor Cst3 is connected to the output terminal of the second switching element Qb and the first reference voltage line C1 associated with the first pixel column; the fourth storage capacitor Cst4 is connected to the output terminal of the second switching element Qb and the second reference voltage line C2 associated with the first pixel column.

The fourth pixel PX(i+1, j+1), which is connected to the second gate line Gn+1, the third data line Dn+2, the first reference voltage line C1 associated with the second pixel column, and the second reference voltage line C2 associated with the second pixel column, may include a first switching element Qa, a second switching element Qb, a third switching element Qc, a first liquid crystal capacitor Clca, a second liquid crystal capacitor Clcb, a first storage capacitor Cst1, a second storage capacitor Cst2, a third storage capacitor Cst3, and a fourth storage capacitor Cst4.

For the first switching element Qa and the second switching element Qb of the fourth pixel PX(i+1, j+1), the control terminals are each connected to the second gate line Gn+1, and the input terminals are each connected to the third data line Dn+2.

For the fourth pixel PX(i+1, j+1), the output terminal of the first switching element Qa is connected to the first liquid crystal capacitor Clca and the output terminal of the third switching element Qc; the output terminal of the second switching element Qb is connected to the second liquid crystal capacitor Clcb.

For the third switching element Qc of the fourth pixel PX(i+1, j+1), the control terminal is connected to the second gate line Gn+1, the input terminal is connected to the second reference voltage line C2 associated with the second pixel column, and the output terminal is connected to the first liquid crystal capacitor Clca.

For the fourth pixel PX(i+1, j+1), the first storage capacitor Cst1 is connected to the output terminal of the first switching element Qa and the second reference voltage line C2 associated with the second pixel column; the second storage capacitor Cst2 is connected to the output terminal of the first switching element Qa and the first reference voltage line C1 associated with the second pixel column; the third storage capacitor Cst3 is connected to the output terminal of the second switching element Qb and the second reference voltage line C2 associated with the second pixel column; the fourth storage capacitor Cst4 is connected to the output terminal of the second switching element Qb and the first reference voltage line C1 associated with the second pixel column.

If a gate-on-signal is applied to the first gate line Gn, the first switching element Qa, the second switching element Qb, and the third switching element Qc of each of the first pixel PX(i, j) and the second pixel PX(i, j+1) are turned on. Accordingly, the data voltage applied to the first data line Dn is applied through the turned-on first switching element Qa and second switching element Qb of the first pixel PX(i, j) to one terminal of each of the first liquid crystal capacitor Clca and the second liquid crystal capacitor Clcb of the first pixel PX(i, j), and the data voltage applied to the second data line Dn+1 is applied through the turned-on first switching element Qa and second switching element Qb of the second pixel PX(i, j+1) to one terminal of each of the first liquid crystal capacitor Clca and the second liquid crystal capacitor Clcb of the second pixel PX(i, j+1). As a result, the first liquid crystal capacitor Clca and the second liquid crystal capacitor Clcb of the first pixel PX(i, j) are charged by the same data voltage applied through the first data line Dn, and the first liquid crystal capacitor Clca and the second liquid crystal capacitor Clcb of the second pixel PX(i, j+1) are charged by the same data voltage applied through the second data line Dn+1. Simultaneously, the previously-mentioned one terminal of the first liquid crystal capacitor Clca of the first pixel PX(i, j) is connected to the output terminal of the third switching element Qc of the first pixel PX(i, j) to boost the charged voltage according to the second reference voltage applied through the third switching element Qc from the second reference voltage line C2 associated with the first pixel column. In one or more embodiments, the second reference voltage applied to the second reference voltage line C2 associated with the first pixel column has the same polarity as the data voltage applied to the first data line Dn, and may have a magnitude (or value) that is larger than that of the data voltage applied to the first data line Dn. Accordingly, the voltage charged in the first liquid crystal capacitor Clca of the first pixel PX(i, j) may have a magnitude (or value) that is higher than the magnitude of the data voltage applied through the first data line Dn.

The previously-mentioned one terminal of the first liquid crystal capacitor Clca of the second pixel PX(i, j+1) is connected to the output terminal of the third switching element Qc of the second pixel PX(i, j+1) to boost the charged voltage according to the first reference voltage applied through the third switching element Qc from the first reference voltage line C1 associated with the second pixel column. In one or more embodiments, the first reference voltage applied to the first reference voltage line C1 associated with the second pixel column has the same polarity as the data voltage applied to the second data line Dn+1, and may have a magnitude (or value) that is higher than the magnitude (or value) of the data voltage applied to the second data line Dn+1. Accordingly, the voltage charged in the first liquid crystal capacitor Clca of the second pixel PX(i, j+1) may have a magnitude (or value) that is higher than the magnitude of the data voltage applied through the second data line Dn+1.

If the gate voltage of the first gate line Gn is changed into a gate-off voltage, and if the gate voltage of the second gate line Gn+1 is changed into a gate-on voltage, the first switching element Qa, the second switching element Qb, and the third switching element Qc of each of the third pixel PX(i+1, j) and the fourth pixel PX(i+1, j+1) are turned on. Accordingly, the data voltage applied to the second data line Dn+1 is applied through the turned-on first switching element Qa and second switching element Qb of the third pixel PX(i+1, j) to one terminal of each of the first liquid crystal capacitor Clca and the second liquid crystal capacitor Clcb of the third pixel PX(i+1, j), and the data voltage applied to the third data line Dn+2 is applied through the turned-on first switching element Qa and second switching element Qb of the fourth pixel PX(i+1, j+1) to one terminal of each of the first liquid crystal capacitor Clca and the second liquid crystal capacitor Clcb of the fourth pixel PX(i+1, j+1). As a result, the first liquid crystal capacitor Clca and the second liquid crystal capacitor Clcb of the third pixel PX(i+1, j) are charged by the same data voltage applied through the second data line Dn+1, and the first liquid crystal capacitor Clca and the second liquid crystal capacitor Clcb of the fourth pixel PX(i+1, j+1) are charged by the same data voltage applied through the third data line Dn+2. Simultaneously, the previously-mentioned one terminal of the first liquid crystal capacitor Clca of the third pixel PX(i+1, j) is connected to the output terminal of the third switching element Qc of the third pixel PX(i+1, j) to boost the charged voltage according to the first reference voltage applied through the third switching element Qc from the first reference voltage line C1 associated with the first pixel column. In one or more embodiments, the first reference voltage applied to the first reference voltage line C1 associated with the first pixel column has the same polarity as the data voltage applied to the second data line Dn+1, and may have a value that is higher than the value of the data voltage applied to the second data line Dn+1. Accordingly, the value (or magnitude) of the voltage charged in the first liquid crystal capacitor Clca of the third pixel PX(i+1, j) may have a value that is higher than that of the data voltage applied through the second data line Dn+1.

The previously-mentioned one terminal of the first liquid crystal capacitor Clca of the fourth pixel PX(i+1, j+1) is connected to the output terminal of the third switching element Qc of the fourth pixel PX(i+1, j+1) to boost the charged voltage according to the second reference voltage applied through the third switching element Qc to the second reference voltage line C2 associated with the second pixel column. In one or more embodiments, the second reference voltage applied to the second reference voltage line C2 associated with the second pixel column has the same polarity as the data voltage applied to the third data line Dn+2, and may have a magnitude (or value) that is higher than the magnitude of the data voltage applied to the third data line Dn+2. Accordingly, the magnitude of the voltage charged in the first liquid crystal capacitor Clca of the fourth pixel PX(i+1, j+1) is larger than the magnitude of the data voltage applied through the third data line Dn+2.

For each of the pixels, the voltage charged in the first liquid crystal capacitor Clca and the voltage charged in the second liquid crystal capacitor Clcb may become different from each other. Since the voltage charged in the first liquid crystal capacitor Clca and the voltage charged in the second liquid crystal capacitor Clcb are different from each other, inclination angles of liquid crystal molecules in the first sub-pixel may be different from inclination angles of liquid crystal molecules in the second sub-pixel; accordingly, luminances of two subpixels become different from each other. In one or more embodiments, the value of the voltage charged in the first liquid crystal capacitor Clca and the value of the voltage charged in the second liquid crystal capacitor Clcb are appropriately adjusted, such that perception of an image viewed in a lateral surface may approximate perception of the image viewed in a front surface. Advantageously, the liquid crystal display may provide satisfactory lateral surface visibility.

Figure 2:
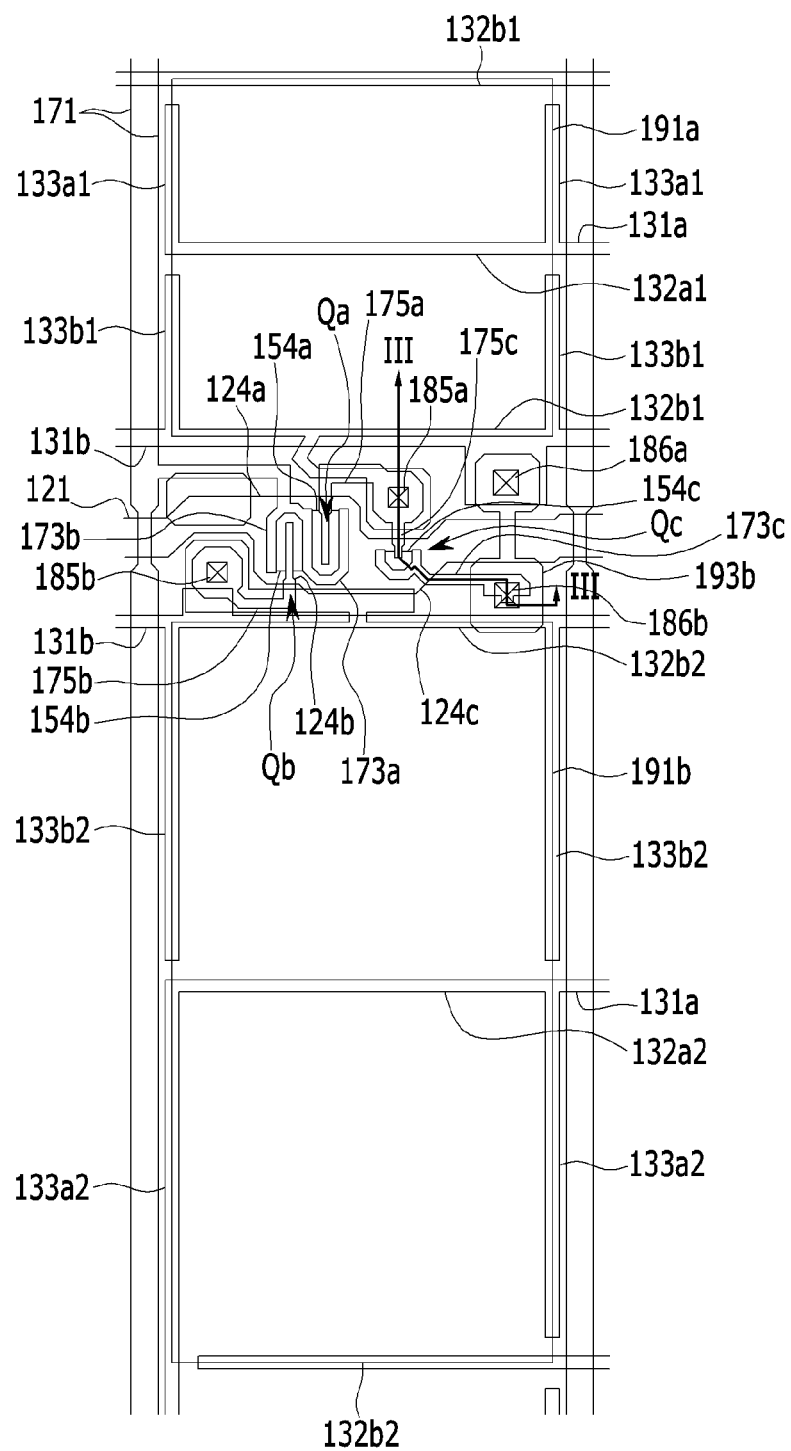
FIG. 2 is a layout view (or plan view) illustrating a liquid crystal display according to one or more embodiments of the present invention.
Figure 3:
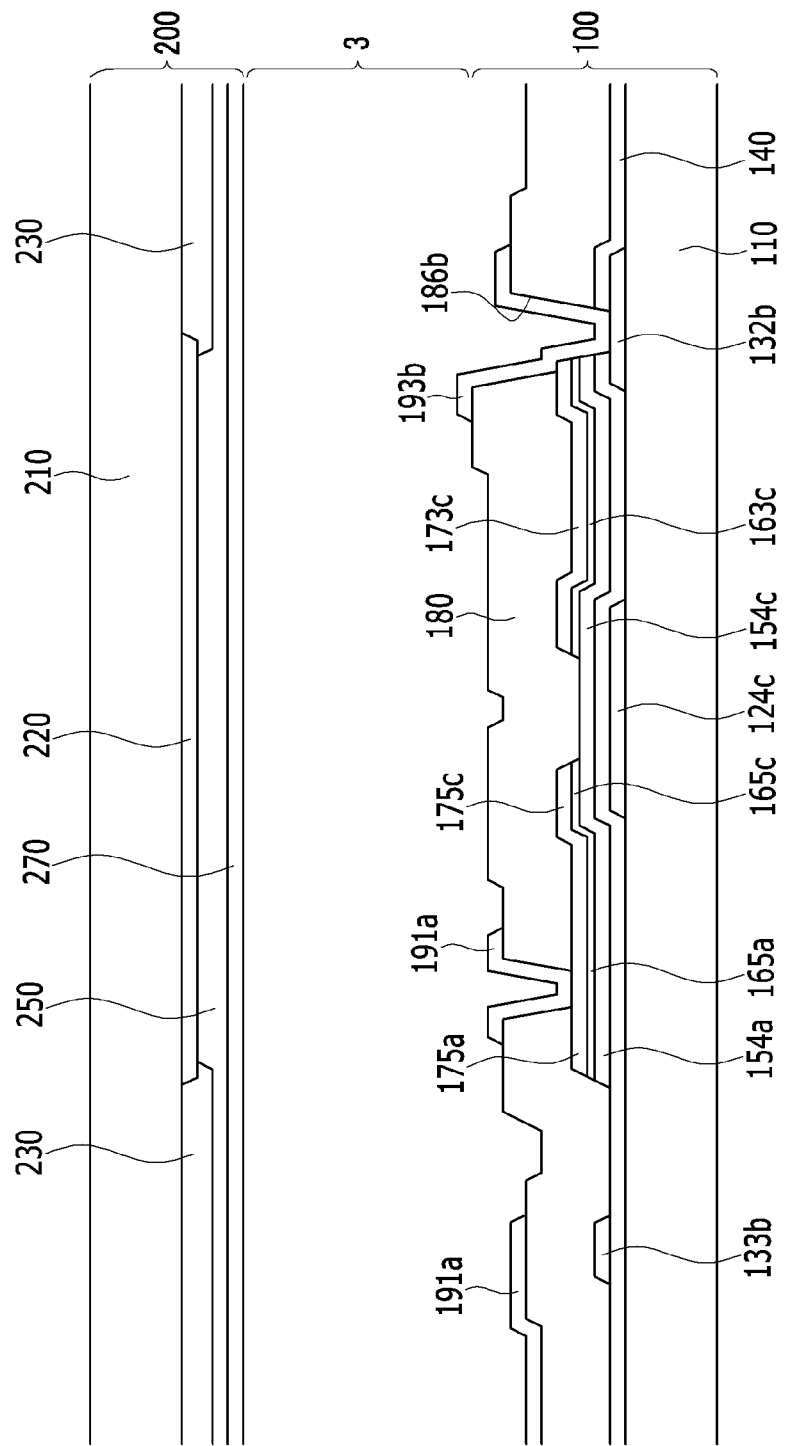
FIG. 3 is a cross-sectional view of the liquid crystal display taken along line III-III indicated in FIG. 2.

FIG. 2 is a layout view (or plan view) illustrating the liquid crystal display according to one or more embodiments of the present invention, and FIG. 3 is a cross-sectional view of the liquid crystal display taken along line III-III indicated in FIG. 2.

Referring to FIGS. 2 and 3, the liquid crystal display includes a lower panel 100, an upper panel 200 overlapping the lower panel 100, and a liquid crystal layer 3 disposed between the two panels 100 and 200.

The lower panel 100 may include elements described as follows.

Gate conductors including a plurality of gate lines 121 and a plurality of reference voltage lines 131a and 131b are disposed on a first insulating substrate 110.

The gate line 121 may transfer a gate signal. The gate line 121 includes a first gate electrode 124a, a second gate electrode 124b, and a third gate electrode 124c.

The reference voltage lines 131a and 131b include a first reference voltage line 131a for transferring a first reference voltage and a second reference voltage line 131b for transferring a second reference voltage.

Each of the first reference voltage line 131a and the second reference voltage line 131b may include portions that are disposed at the left side and the right side along at least one pixel column that is disposed between two data lines 171. In one or more embodiments, a portion of the first reference voltage line 131a is disposed at the left side of a pixel column, and another portion of the first reference voltage line 131a is disposed on the right side of the pixel column. In one or more embodiments, a portion of the second reference voltage line 131b is disposed at the left side of the pixel column, and another portion of the second reference voltage line 131b is disposed on the right side of the pixel column.

The first reference voltage line 131a has a horizontal portion that is parallel to the gate line 121 and a vertical portion that is parallel to the data line 171. The second reference voltage line 131b has a horizontal portion that is parallel to the gate line 121 and a vertical portion that is parallel to the data line 171.

A gate insulating layer 140 is disposed on the gate line 121 and the reference voltage lines 131a and 131b.

A first semiconductor 154a, a second semiconductor 154b, and a third semiconductor 154c are disposed on the gate insulating layer 140.

Ohmic contacts 165a, 165c, and 163c are disposed on the first semiconductor 154a, the second semiconductor 154b, and the third semiconductor 154c, respectively. The semiconductors 154a, 154b, and 154c may include an oxide semiconductor. In one or more embodiments, the semiconductors 154a, 154b, and 154c include an oxide semiconductor, and the ohmic contacts may be omitted.

Data conductors, including the data line 171, a first source electrode 173a, a second source electrode 173b, a third source electrode 173c, a first drain electrode 175a, a second drain electrode 175b, and a third drain electrode 175c, are formed on the ohmic contacts 165a, 163c, and 165c and the gate insulating layer 140. The first drain electrode 175a and the third drain electrode 175c are connected to each other.

A passivation layer 180 is disposed on the data conductors. The passivation layer 180 may include an inorganic insulator and/or an organic insulator.

A first contact hole 185a (through which a portion of the first drain electrode 175a is exposed) and a second contact hole 185b (through which a portion of the second drain electrode 175b is exposed) are formed through the passivation layer 180.

A first sub-pixel electrode 191a and a second sub-pixel electrode 191b are formed on the passivation layer 180.

The first sub-pixel electrode 191a is physically electrically connected through the first contact hole 185a to the first drain electrode 175a, and the second sub-pixel electrode 191b is physically electrically connected through the second contact hole 185b to the second drain electrode 175b.

The first sub-pixel electrode 191a and the second sub-pixel electrode 191b are separated (and electrically insulated) from each other and may be disposed in a same pixel column extending in a column direction. The gate line 121 may be disposed between the first sub-pixel electrode 191a and the second sub-pixel electrode 191b in a plan view of the liquid crystal display. The first sub-pixel electrode 191a and/or the second sub-pixel electrode 191b may include a basic electrode illustrated in FIG. 4 and/or may include one or more modifications of the basic electrode.

The area of the second sub-pixel electrode 191b may be larger than the area of the first sub-pixel electrode 191a.

The first gate electrode 124a, the first semiconductor 154a, the first source electrode 173a, and the first drain electrode 175a form a first switching element Qa. The second gate electrode 124b, the second semiconductor 154b, the second source electrode 173b, and the second drain electrode 175b form a second switching element Qb. The third gate electrode 124c, the third semiconductor 154c, the third source electrode 173c, and the third drain electrode 175c form a third switching element Qc.

The upper panel 200 may include elements described as follows.

A light blocking member 220 is disposed on a second insulating substrate 210. The light blocking member 220 (which is also called a black matrix) may prevent light leakage. A plurality of color filters 230 is disposed on the second insulating substrate 210 and may overlap the light blocking member 220. An overcoat 250 is disposed on the color filters 230. The overcoat 250 may prevent the color filters 230 and the light blocking member 220 from being lifted and may prevent contamination of the liquid crystal layer 3 caused by an organic material (such as a solvent) inflowing from the color filter 230, thereby preventing defects (such as afterimages) that may occur in displayed images. In one or more embodiments, the overcoat 250 may be omitted. A common electrode 270 is disposed on the overcoat 250.

In one or more embodiments, the light blocking member 220 and the color filters 230 are disposed on the upper panel 200. In one or more embodiments, the light blocking member 220 and the color filter 230 may be disposed on the lower panel 100. In one or more embodiments, the color filter 230, instead of the passivation layer 180, may be disposed in the lower panel 100.

The first sub-pixel electrode 191a, the common electrode 270, and a portion of the liquid crystal layer 3 disposed between the first sub-pixel electrode 191a and the common electrode 270 may form a first liquid crystal capacitor Clca. The second sub-pixel electrode 191b, the common electrode 270, and a portion of the liquid crystal layer 3 disposed between the second sub-pixel electrode 191b and the common electrode 270 may form the second liquid crystal capacitor Clcb.

An electric field is applied to the liquid crystal layer 3. The electric field is determined by a voltage applied to the first sub-pixel electrode 191a, a voltage applied to the second sub-pixel electrode 191b, and a common voltage applied to the common electrode 270. An orientation of liquid crystal molecules of the liquid crystal layer 3 is determined according to the electric field. The luminance of light transmitted through the liquid crystal layer 3 depends on the orientation of the liquid crystal molecules.

The first sub-pixel electrode 191a overlaps a vertical portion of the first reference voltage line 131a and a portion of the second reference voltage line 131b to form a first storage capacitor Cst1 and a second storage capacitor Cst2, for increasing a voltage storage ability of the first liquid crystal capacitor Clca. The second sub-pixel electrode 191b overlaps a vertical portion of the first reference voltage line 131a and a portion of the second reference voltage line 131b to form a third storage capacitor Cst3 and a fourth storage capacitor Cst4 and increase a voltage storage ability of the second liquid crystal capacitor Clcb.

The first sub-pixel electrode 191a overlaps at least a portion of two first vertical portions 133a1 of the first reference voltage line 131a. The two first vertical portions 133a1 of the first reference voltage line 131a respectively overlap a left side and a right side of the first sub-pixel electrode 191a. The two first vertical portions 133a1 of the first reference voltage line 131a may have substantially equal lengths and substantially equal widths. The two first vertical portions 133a1 of the first reference voltage line 131a are connected to each other by a first horizontal portion 132a1 of the first reference voltage line 131a. The first horizontal portion 132a1 of the first reference voltage line 131a overlaps the first sub-pixel electrode 191a.

The first sub-pixel electrode 191a overlaps at least a portion of two second vertical portions 133b1 of the second reference voltage line 131b. The two second vertical portions 133b1 of the second reference voltage line 131b respectively overlap the left side and the right side of the first sub-pixel electrode 191a. The two second vertical portions 133b1 of the second reference voltage line 131b may have substantially equal lengths and substantially equal widths. The two second vertical portions 133b1 of the second reference voltage line 131b are connected to each other by a second horizontal portion 132b1 of the second reference voltage line 131b.

The first vertical portion 133a1 of the first reference voltage line 131a and the second vertical portion 133b1 of the second reference voltage line 131b are spaced apart from each other. The overlapping area of the first sub-pixel electrode 191a and the first vertical portion 133a1 of the first reference voltage line 131a is substantially equal to the overlapping area of the first sub-pixel electrode 191a and the second vertical portion 133b1 of the second reference voltage line 131b.

The second sub-pixel electrode 191b overlaps at least a portion of two third vertical portions 133a2 of the first reference voltage line 131a. The two third vertical portions 133a2 of the first reference voltage line 131a respectively overlap the left side and the right side of the second sub-pixel electrode 191b. The two third vertical portions 133a2 of the first reference voltage line 131a may have substantially equal lengths and substantially equal widths. The two third vertical portions 133a2 of the first reference voltage line 131a are connected to each other by a third horizontal portion 132a2 of the first reference voltage line 131a. The third horizontal portion 132a2 of the first reference voltage line 131a overlaps the second sub-pixel electrode 191b.

The second sub-pixel electrode 191b overlaps at least a portion of two fourth vertical portions 133b2 of the second reference voltage line 131b. The two fourth vertical portions 133b2 of the second reference voltage line 131b respectively overlap the left side and the right side of the second sub-pixel electrode 191b. The two fourth vertical portions 133b2 of the second reference voltage line 131b may have substantially equal lengths and substantially equal widths. The two fourth vertical portions 133b2 of the second reference voltage line 131b are connected to each other by a fourth horizontal portion 132b2 of the second reference voltage line 131b.

The third vertical portion 133a2 of the first reference voltage line 131a and the fourth vertical portion 133b2 of the second reference voltage line 131b are spaced apart from each other. The overlapping area of the second sub-pixel electrode 191b and the third vertical portion 133a2 of the first reference voltage line 131a is substantially equal to the overlapping area of the second sub-pixel electrode 191b and the fourth vertical portion 133b2 of the second reference voltage line 131b.

Two vertical portions of the first reference voltage line 131a are respectively disposed at the left side and the right side of the first sub-pixel electrode 191a, and two vertical portions of the second reference voltage line 131b are respectively disposed at the left side and the right side of the first sub-pixel electrode 191a. Accordingly, even if misalignment occurs at the left side or the right side of the first sub-pixel electrode 191a, the overlapping areas of the first sub-pixel electrode 191a and the first vertical portions 133a1 of the first reference voltage line 131a may be substantially constant, and the overlapping areas of the first sub-pixel electrode 191a and the second vertical portions 133b1 of the second reference voltage line 131b may be substantially constant.

Therefore, a potential substantial change in voltage of the first sub-pixel electrode 191a caused by a substantial change in overlapping area of the first sub-pixel electrode 191a and either of the first reference voltage line 131a and the second reference voltage line 131b may be prevented.

Analogously, two vertical portions of the first reference voltage line 131a are respectively disposed at the left side and the right side of the second sub-pixel electrode 191b, and two vertical portions of the second reference voltage line 131b are respectively disposed at the left side and the right side of the second sub-pixel electrode 191b. Accordingly, even if misalignment occurs at the left side or the right side of the second sub-pixel electrode 191b, the overlapping areas of the second sub-pixel electrode 191b and the third vertical portions 133a2 of the first reference voltage line 131a may be substantially constant, and the overlapping areas of the second sub-pixel electrode 191b and the fourth vertical portions 133b2 of the second reference voltage line 131b may be substantially constant.

Therefore, a potential change in voltage of the second sub-pixel electrode 191b caused by a change in overlapping area of the second sub-pixel electrode 191b and either of the first reference voltage line 131a and the second reference voltage line 131b may be prevented.

In the liquid crystal display, since portions of the first reference voltage line 131a and portions of the second reference voltage line 131b are disposed at the left side and the right side of each of the sub-pixel electrodes 191a and 191b, even if misalignment occurs at the left side or the right side of each of the sub-pixel electrodes 191a and 191b, the overlapping areas of each of the sub-pixel electrodes 191a and 191b and each of the first reference voltage line 131a and the second reference voltage line 131b may remain substantially constant.

Therefore, a potential substantial change in voltage of the first sub-pixel electrode 191a caused by a substantial change in overlapping area of the first sub-pixel electrode 191a and the first reference voltage line 131a and the second reference voltage line 131b may be prevented.

In one or more embodiments, the first horizontal portion 132a1 of the first reference voltage line 131a is disposed at (and overlaps) a substantially central portion of the first sub-pixel electrode 191a and extends in a pixel row direction, and the two second horizontal portions 132b1 of the second reference voltage line 131b are respectively disposed to at (and respectively partially overlap) upper side and lower side edges of the first sub-pixel electrode 191a and extend in the pixel row direction. Herein the terms "horizontal", "vertical", "upper" and "lower" are provided in view of a standing position of the liquid crystal display. Accordingly, even if misalignment occurs at the upper side and the lower side of the first sub-pixel electrode 191a, the overlapping area of the first sub-pixel electrode 191a and the first horizontal portion 132a1 of the first reference voltage line 131a may remain substantially constant, and the overlapping area of the first sub-pixel electrode 191a and the second horizontal portion 132b1 of the second reference voltage line 133b may remain substantially constant. In one or more embodiments, even if misalignment occurs at the upper side and the lower side of the first sub-pixel electrode 191a, the overlapping area of the first sub-pixel electrode 191a and the first horizontal portion 132a1 of the first reference voltage line 131a may be substantially equal to the overlapping area of the first sub-pixel electrode 191a and the second horizontal portions 132b1 of the second reference voltage line 133b.

Analogously, the two third horizontal portions 132a2 of the first reference voltage line 131a are respectively disposed at (and respectively partially overlap) the upper side edge and the lower side edge of the second sub-pixel electrode 191b and extend in the pixel row direction, and the fourth horizontal portion 132b2 of the second reference voltage line 131b is disposed at a substantially central portion of the second sub-pixel electrode 191b and extends in the pixel row direction. Accordingly, even if misalignment occurs at the upper side and the lower side of the second sub-pixel electrode 191b, the overlapping area of the second sub-pixel electrode 191b and the third horizontal portions 132a2 of the first reference voltage line 131a may remain substantially constant, and the overlapping area of the second sub-pixel electrode 191b and the fourth horizontal portion 132b2 of the second reference voltage line 133b may remain substantially constant. In one or more embodiments, even if misalignment occurs at the upper side and the lower side of the second sub-pixel electrode 191b, the overlapping area of the second sub-pixel electrode 191b and the third horizontal portion 132a2 of the first reference voltage line 131a may be substantially equal to the overlapping area of the second sub-pixel electrode 191b and the fourth horizontal portion 132b2 of the second reference voltage line 133b.

Figure 4:
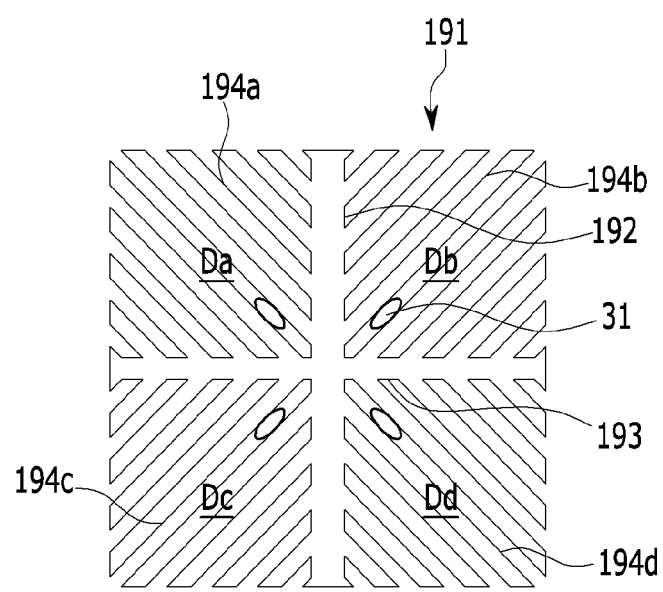
FIG. 4 is a top plan view illustrating a basic region of a field generating electrode of a liquid crystal display according to one or more embodiments of the present invention.

FIG. 4 is a top plan view illustrating a basic electrode 191, or basic region of a field generating electrode, of the liquid crystal display according to one or more embodiments of the present invention.

Referring to FIG. 4, an outer shape of the basic electrode 191 may be substantially quadrangle, and the basic electrode 191 may include a cross-shaped stem portion that includes a horizontal stem portion 193 and a vertical stem portion 192. The basic electrode 191 may include a first sub-region Da, a second sub-region Db, a third sub-region Dc, and a fourth sub-region Dd, defined by the horizontal stem portion 193 and the vertical stem portion 192. The sub-regions Da-Dd respectively include fine branched portions 194a, 194b, 194c, and 194d.

The first fine branched portion 194a extends obliquely in an upper left direction from the horizontal stem portion 193 or the vertical stem portion 192. The second fine branched portion 194b extends obliquely in an upper right direction from the horizontal stem portion 193 or the vertical stem portion 192. The third fine branched portion 194c extends obliquely in a lower left direction from the horizontal stem portion 193 or the vertical stem portion 192. The fourth fine branched portion 194d extends obliquely in a lower right direction from the horizontal stem portion 193 or the vertical stem portion 192.

Each of the fine branched portions 194a, 194b, 194c, and 194d may form an angle of approximately 45° or 135° with the gate line 121 or the horizontal stem portion 193. Two fine branch portions of two of sub-regions Da, Db, Dc, and Dd aligned in a row direction or column direction may be orthogonal to each other.

If an electric field is applied to the liquid crystal layer 3, sides of the fine branched portions 194a, 194b, 194c, and 194d may form fringe fields. As a result, liquid crystal molecules 31 may be oriented in directions parallel to length directions of the fine branched portions 194a, 194b, 194c, and 194d.

Since the basic electrode 191 includes four sub-regions Da-Dd in which length directions of the fine branched portions 194a, 194b, 194c, and 194d are different from each other, the liquid crystal molecules 31 may be oriented and aligned in about four directions. Accordingly, four domains corresponding to four alignment directions of the liquid crystal molecules 31 may be formed in the liquid crystal layer 3. In one or more embodiments, since the alignment directions of the liquid crystal molecules are diversified, a satisfactory large standard viewing angle may be provided.

Figure 5:
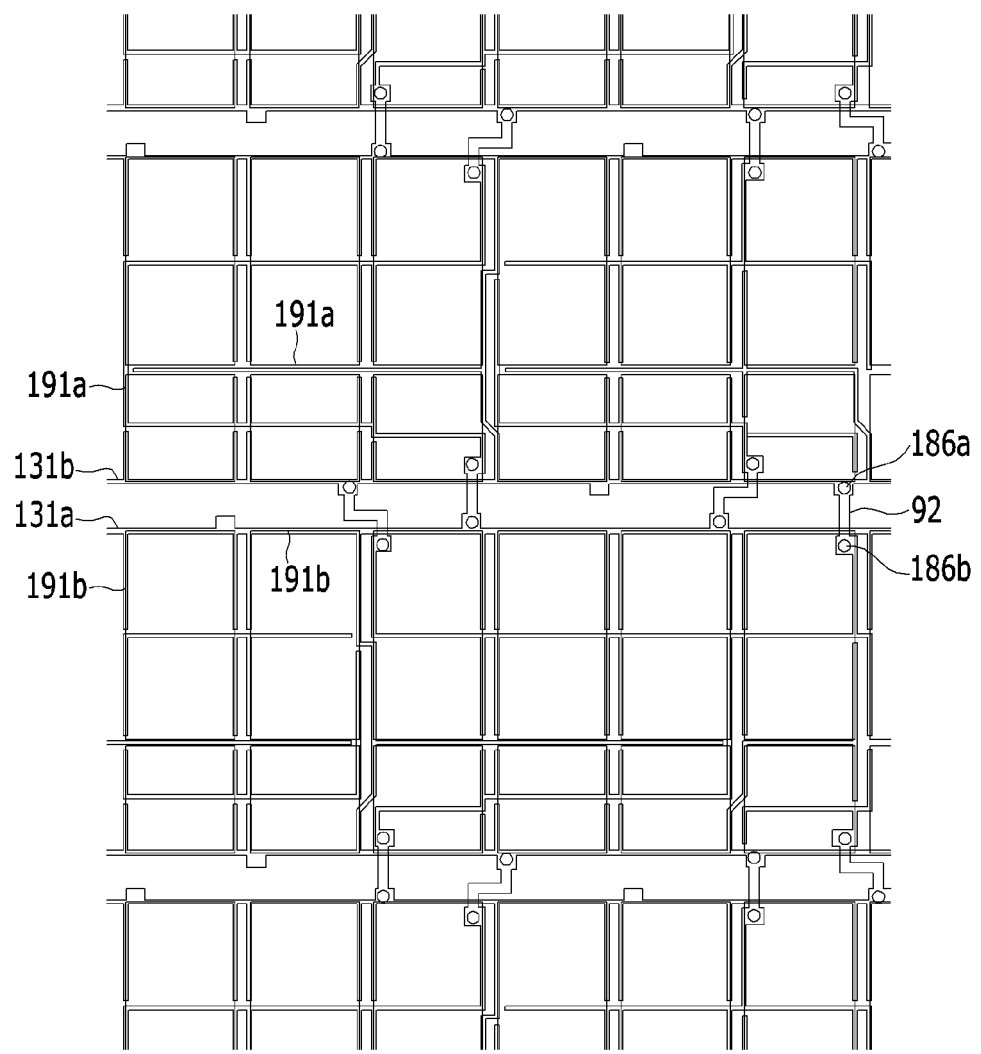
FIG. 5 is a layout view (or plan view) illustrating configurations of voltage applying lines and pixel electrodes of a liquid crystal display according to one or more embodiments of the present invention.

FIG. 5 is a layout view illustrating configurations of voltage applying lines and pixel electrodes of the liquid crystal display according to one or more embodiments of the present invention.

Referring to FIG. 5, a horizontal connection line of each of the first reference voltage line 131a and the second reference voltage line 131b disposed in a pixel region is disposed at the central portion of a first sub-pixel electrode 191a, the central portion of a second sub-pixel electrode 191b, or at least one of the upper side and the lower side of a first sub-pixel electrode 191a or a second sub-pixel electrode 191b. In one or more embodiments, two first reference voltage lines 131a or two second reference voltage lines 131b that overlap (and/or are associated with) some adjacent pixels are electrically connected to each other through a connecting member 92, each being connected to the connecting member 92 through one of two contact holes 186a and 186b. The connection of two first reference voltage lines 131a or two second reference voltage lines 131b associated with adjacent pixels may substantially minimize or prevent signal delay.

As described with reference to FIG. 2, the first sub-pixel electrode 191a overlaps at least a portion of the two first vertical portions 133a1 of the first reference voltage line 131a, and the two first vertical portions 133a1 of the first reference voltage line 131a are respectively disposed at the left side and the right side of the first sub-pixel electrode 191a. The two first vertical portions 133a1 of the first reference voltage line 131a may have substantially equal lengths and substantially equal widths. The two first vertical portions 133a1 of the first reference voltage line 131a are connected to each other by the first horizontal portion 132a1 of the first reference voltage line 131a. The first horizontal portion 132a1 of the first reference voltage line 131a overlaps (a substantially central portion of) the first sub-pixel electrode 191a.

The first sub-pixel electrode 191a overlaps at least a portion of the two second vertical portions 133b1 of the second reference voltage line 131b, and the two second vertical portions 133b1 of the second reference voltage line 131b are respectively disposed at the left side and the right side of the first sub-pixel electrode 191a. The two second vertical portions 133b1 of the second reference voltage line 131b may have substantially equal lengths and substantially equal widths. The two second vertical portions 133b1 of the second reference voltage line 131b are connected to each other by the second horizontal portion 132b1 of the second reference voltage line 131b. The second horizontal portion 132b1 of the second reference voltage line 131b may overlap an edge of the first sub-pixel electrode 191a and may be disposed closer to the second sub-pixel electrode 191b than both the two second vertical portions 133b1 of the second reference voltage line 131b.

The second sub-pixel electrode 191b overlaps at least a portion of two third vertical portions 133a2 of the first reference voltage line 131a. The two third vertical portions 133a2 of the first reference voltage line 131a are respectively disposed at the left side and the right side of the second sub-pixel electrode 191b. The two third vertical portions 133a2 of the first reference voltage line 131a may have substantially equal lengths and substantially equal widths. The two third vertical portions 133a2 of the first reference voltage line 131a are connected to each other by the third horizontal portion 132a2 of the first reference voltage line 131a. The third horizontal portion 132a2 of the first reference voltage line 131a overlaps (an edge of) the second sub-pixel electrode 191b. The third horizontal portion 132a2 of the first reference voltage line 131a may be disposed closer to the first sub-pixel electrode 191a than both the two third vertical portions 133a2 of the first reference voltage line 131a.

The second sub-pixel electrode 191b overlaps at least a portion of two fourth vertical portions 133b2 of the second reference voltage line 131b. The two fourth vertical portions 133b2 of the second reference voltage line 131b are respectively disposed at the left side and the right side of the second sub-pixel electrode 191b. The two fourth vertical portions 133b2 of the second reference voltage line 131b may have substantially equal lengths and substantially equal widths. The two fourth vertical portions 133b2 of the second reference voltage line 131b are connected to each other by the fourth horizontal portion 132b2 of the second reference voltage line 131b. The fourth horizontal portion 132b2 of the second reference voltage line 131b may overlap a substantially central portion of the second sub-pixel electrode 191b.

Two vertical portions of the first reference voltage line 131a are respectively disposed at the left side and the right side of the first sub-pixel electrode 191a, and two vertical portions of the second reference voltage line 131b are respectively disposed at the left side and the right side of the first sub-pixel electrode 191a. Accordingly, even if misalignment occurs at the left side or the right side of the first sub-pixel electrode 191a, the overlapping areas of the first sub-pixel electrode 191a and the first vertical portions 133a1 of the first reference voltage line 131a may be substantially constant, and the overlapping areas of the first sub-pixel electrode 191a and the second vertical portion 133b1 of the second reference voltage line 131b may be substantially constant.

Therefore, the voltage of the first sub-pixel electrode 191a may not affected by a substantial change in overlapping area of the first sub-pixel electrode 191a and either of the first reference voltage line 131a and the second reference voltage line 131b and may remain substantially constant.

Analogously, two vertical portions of the first reference voltage line 131a are respectively disposed at the left side and the right side of the second sub-pixel electrode 191b, and two vertical portions of the second reference voltage line 131b are respectively disposed at the left side and the right side of the second sub-pixel electrode 191b. Accordingly, even if misalignment occurs at the left side or the right side of the second sub-pixel electrode 191b, the overlapping areas of the second sub-pixel electrode 191b and the third vertical portions 133a2 of the first reference voltage line 131a may be substantially constant, and the overlapping areas of the second sub-pixel electrode 191b and the fourth vertical portions 133b2 of the second reference voltage line 131b may be substantially constant.

Therefore, the voltage of the second sub-pixel electrode 191b may not be affected by a substantial change in overlapping area of the second sub-pixel electrode 191b and either of the first reference voltage line 131a and the second reference voltage line 131b and may remain substantially constant.

If the two reference voltage lines are arranged according to an opposite-side configuration wherein the first reference voltage line 131a is disposed at only one of the left side and the right side of the first sub-pixel electrode 191a and wherein the second reference voltage line 131b is disposed at the other one of the left side and the right side of the first sub-pixel electrode 191a, in the case where misalignment occurs at the left side of the first sub-pixel electrode 191a, the overlapping area of the first sub-pixel electrode 191a with the first reference voltage line 131a or the second reference voltage line 131b disposed at the left side of the first sub-pixel electrode 191a may become wide, and the overlapping area of the first sub-pixel electrode 191a with the reference voltage line disposed at the right side of the first sub-pixel electrode 191a may become narrow. According to the aforementioned opposite-side configuration, in the case where misalignment occurs at the right side of the first sub-pixel electrode 191a, the overlapping area of the first sub-pixel electrode 191a with the first reference voltage line 131a or the second reference voltage line 131b disposed at the right side of the first sub-pixel electrode 191a may become wide, and the overlapping area of the first sub-pixel electrode 191a with the reference voltage line disposed at the left side of the first sub-pixel electrode 191a may become narrow. As a result, the voltage of the first sub-pixel electrode 191a may be substantially changed according to a difference between overlapping areas of the first sub-pixel electrode 191a with the first reference voltage line 131a and the second reference voltage line 131b to which the first voltage and the second voltage having different polarities and/or different values are applied. The case where the first reference voltage line 131a is disposed at only one of the left side and the right side of the second sub-pixel electrode 191b and where the second reference voltage line 131b is disposed at the other one of the left side and the right side of the second sub-pixel electrode 191b may produce an analogous result.

According to one or more embodiments of the present invention, since portions of the first reference voltage line 131a and portions of the second reference voltage line 131b are disposed at both the left side and the right side of each of the sub-pixel electrodes 191a and 191b, even if misalignment occurs at the left side or the right side of either of the sub-pixel electrodes 191a and 191b, the overlapping areas of each of the sub-pixel electrodes 191a and 191b and each of the first reference voltage line 131a and the second reference voltage line 131b may remain substantially constant.

Therefore, a substantial change in voltage of either of the sub-pixel electrode 191a and 191b caused by a substantial change in overlapping area of the sub-pixel electrode and either of the first reference voltage line 131a and the second reference voltage line 131b may be prevented.

In one or more embodiments, the first horizontal portion 132a1 of the first reference voltage line 131a is disposed at (and overlaps) a substantially central portion of the first sub-pixel electrode 191a, and the two second horizontal portions 132b1 of the second reference voltage line 131b are respectively disposed tat (and respectively partially overlap) upper side and lower side edges of the first sub-pixel electrode 191a. Herein the terms "horizontal", "vertical", "upper" and "lower" are provided in view of a standing position of the liquid crystal display. Accordingly, even if misalignment occurs at the upper side and the lower side of the first sub-pixel electrode 191a, the overlapping area of the first sub-pixel electrode 191a and the first horizontal portion 132a1 of the first reference voltage line 131a may remain substantially constant, and the overlapping area of the first sub-pixel electrode 191a and the second horizontal portion 132b1 of the second reference voltage line 133b remain substantially constant.

Analogously, the two third horizontal portions 132a2 of the first reference voltage line 131a are disposed at (and respectively partially overlap) the upper side edge and the lower side edge of the second sub-pixel electrode 191b, and the fourth horizontal portion 132b2 of the second reference voltage line 131b is disposed at a substantially central portion of the second sub-pixel electrode 191b. Accordingly, even if misalignment occurs at the upper side and the lower side of the second sub-pixel electrode 191b, the overlapping area of the second sub-pixel electrode 191b and the third horizontal portion 132a2 of the first reference voltage line 131a may remain substantially constant, and the overlapping area of the second sub-pixel electrode 191b and the fourth horizontal portion 132b2 of the second reference voltage line 133b remain substantially constant.

Figure 6:
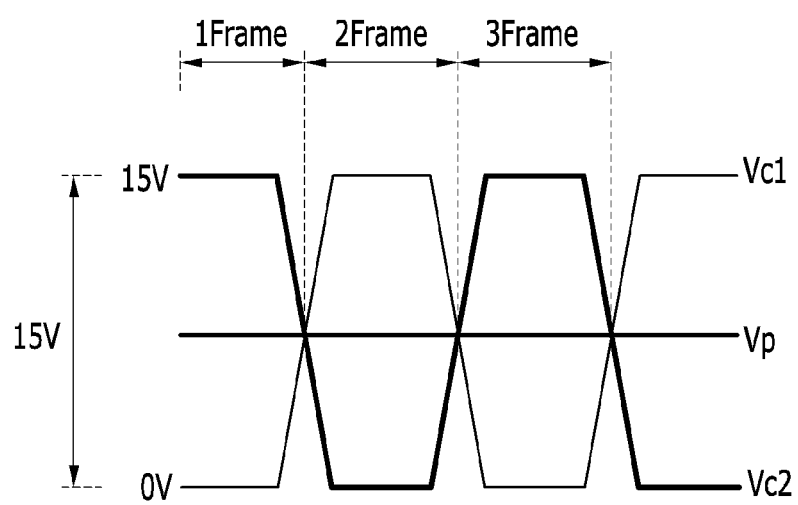
FIG. 6 is a waveform diagram for illustrating reference voltage values and a voltage of a pixel region according to one or more embodiments of the present invention.

FIG. 6 is a waveform diagram for illustrating reference voltage values and a voltage of a pixel region according to one or more embodiments of the present invention.

As described with reference to at least FIGS. 2 and 5, each of the sub-pixel electrodes 191a and 191b overlaps the first reference voltage line 131a and the second reference voltage line 131b, to which the first reference voltage and the second reference voltage having different polarities are applied, to form a storage capacitor.

In one or more embodiments, two vertical portions of the first reference voltage line 131a are respectively disposed at the left side and the right side of the first sub-pixel electrode 191a, and two vertical portions of the second reference voltage line 131b are respectively disposed at the left side and the right side of the first sub-pixel electrode 191a. Accordingly, even if misalignment occurs at the left side or the right side of the first sub-pixel electrode 191a, the overlapping areas of the first sub-pixel electrode 191a and the first vertical portions 133a1 of the first reference voltage line 131a may be substantially constant, and the overlapping areas of the first sub-pixel electrode 191a and the second vertical portions 133b1 of the second reference voltage line 131b may be substantially constant.

Therefore, a substantial change in voltage of the first sub-pixel electrode 191a caused by a substantial change in overlapping area of the first sub-pixel electrode 191a and either of the first reference voltage line 131a and the second reference voltage line 131b may be prevented.

Analogously, two vertical portions of the first reference voltage line 131a are respectively disposed at the left side and the right side of the second sub-pixel electrode 191b, and two vertical portions of the second reference voltage line 131b are respectively disposed at the left side and the right side of the second sub-pixel electrode 191b. Accordingly, even if misalignment occurs at the left side or the right side of the second sub-pixel electrode 191b, the overlapping areas of the second sub-pixel electrode 191b and the third vertical portions 133a2 of the first reference voltage line 131a may be substantially constant, and the overlapping areas of the second sub-pixel electrode 191b and the fourth vertical portions 133b2 of the second reference voltage line 131b may be substantially constant.

Therefore, a substantial change in voltage of the second sub-pixel electrode 191b caused by a substantial change in overlapping area of the second sub-pixel electrode 191b and either of the first reference voltage line 131a and the second reference voltage line 131b may be prevented.

Referring to FIG. 6, a first reference voltage Vc1 applied to the first reference voltage line 131a has a value of about 15 V during a first frame, a value of about 0 V during a second frame, and a value of about 15 V during a third frame. A second reference voltage Vc2 applied to the second reference voltage line 131b has a value of about 0 V during the first frame, a value of about 15 V during the second frame, and a value of about 0 V during the third frame.

In one or more embodiments, the polarities and/or values of the first reference voltage Vc1 and the second reference voltage Vc2 may be changed from frame to frame. In each frame, the polarity and/or value of the first reference voltage Vc1 may be different from the polarity and/or value of the second reference voltage Vc2.

The sub-pixel electrodes 191a and 191b may overlap the first reference voltage line 131a and the second reference voltage line 131b according to the configurations discussed with reference to at least FIGS. 2 and 5. Even if misalignment occurs in either of the sub-pixel electrodes 191a and 191b, since the area of the overlapping areas of each of the sub-pixel electrodes 191a and 191b and each the first reference voltage line 131a and the second reference voltage line 131b may be substantially constant, the magnitude of a voltage Vp charged in each of the sub-pixel electrodes 191a and 191b may remain substantially constant, and the corresponding storage capacitance may remain substantially constant.

In one or more embodiments, the liquid crystal display may adjust the voltage of the first sub-pixel electrode to be higher than the data voltage by boosting the charged voltage according to the reference voltage applied through a reference voltage line. Accordingly, a change in gray in a low gray region may be gently adjusted, and thus it is possible to express a precise gray in the low gray region, provide high luminance, and improve visibility by setting lateral surface visibility to approximate front surface visibility.

Figure 7:
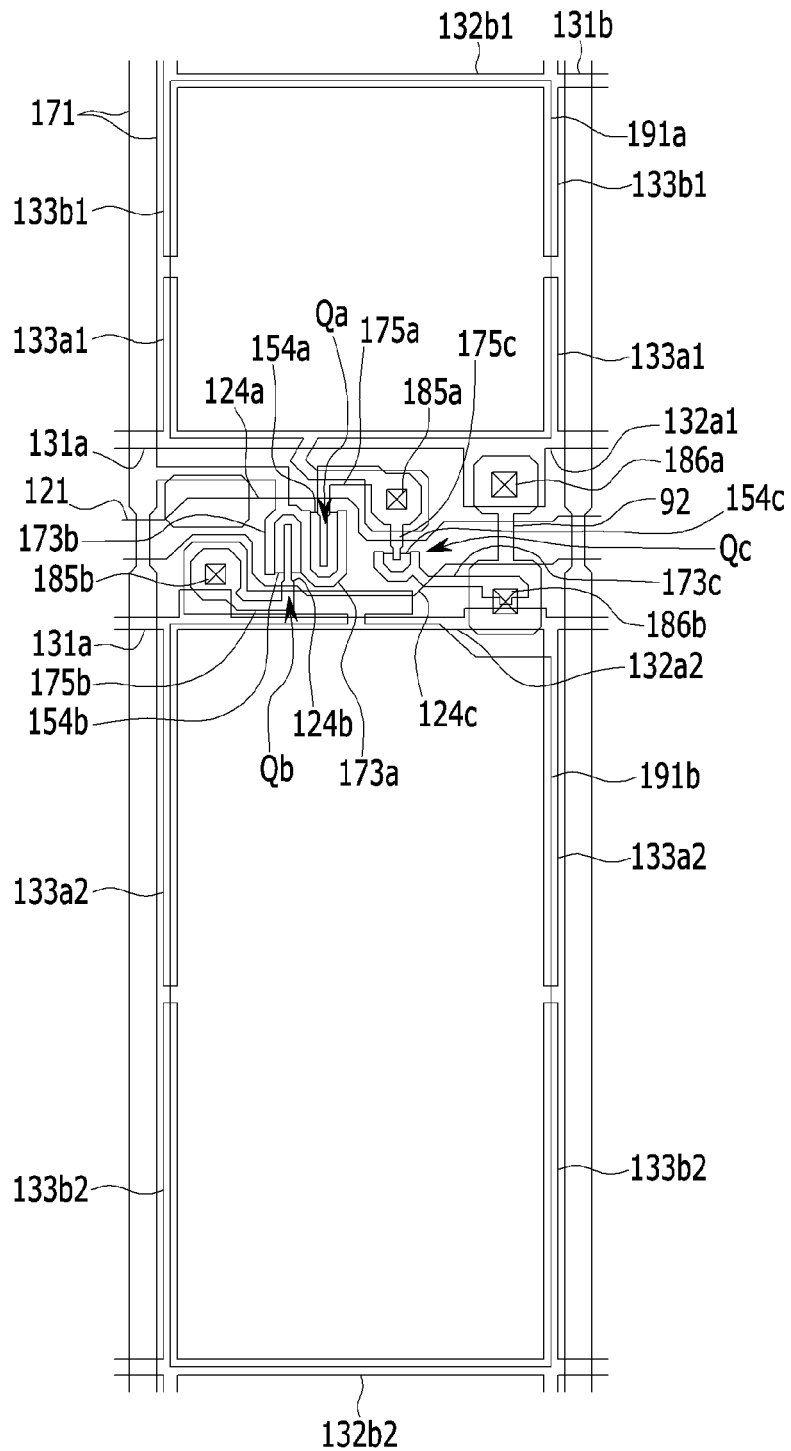
FIG. 7 is a layout view (or plan view) illustrating a liquid crystal display according to one or more embodiments of the present invention.

FIG. 7 is a layout view (or plan view) illustrating a liquid crystal display according to one or more embodiments of the present invention.

The liquid crystal display described with reference to FIG. 7 may include elements that are analogous to or identical to elements of the liquid crystal display described with reference to FIGS. 2 and 3. Detailed description regarding some of the analogous or identical elements may be omitted.

Referring to FIG. 7, in the liquid crystal display, a first reference voltage line 131a includes a first horizontal portion 132a1 that is parallel to (and partially overlaps) a lower side edge of a first sub-pixel electrode 191a, two first vertical portions 133a1 respectively extending from the first horizontal portion 132a1 along (and respectively partially overlapping) left side and right side edges of the first sub-pixel electrode 191a, a third horizontal portion 132a2 that is parallel to (and partially overlaps) an upper side edge of a second sub-pixel electrode 191b, and two third vertical portions 133a2 respectively extending from the third horizontal portion 132a2 along (and respectively partially overlapping) left side and right side edges of the second sub-pixel electrode 191b. Herein the terms "horizontal", "vertical", "upper" and "lower" are provided in view of a standing position of the liquid crystal display.

The first horizontal portion 132a1 that is parallel to the lower side edge of the first sub-pixel electrode 191a and the third horizontal portion 132a2 that is parallel to the upper side edge of the second sub-pixel electrode 191b may be each connected to a first reference voltage line 131a associated with an adjacent pixel to receive the first reference voltage.

Analogously, the second reference voltage line 131b includes a second horizontal portion 132b1 that is parallel to (and partially overlaps) the upper side edge of the first sub-pixel electrode 191a, two second vertical portions 133b1 respectively extending from the second horizontal portion 132b1 along (and respectively partially overlapping) the left side and right side edges of the first sub-pixel electrode 191a, a fourth horizontal portion 132b2 that is parallel to (and partially overlaps) the lower side edge of the second sub-pixel electrode 191b, and two fourth vertical portions 133b2 respectively extending from the fourth horizontal portion 132b2 along (and respectively partially overlapping) the left side and right side edges of the second sub-pixel electrode 191b.

The second horizontal portion 132b1 that is parallel to the upper side edge of the first sub-pixel electrode 191a and the fourth horizontal portion 133b2 that is parallel to the lower side edge of the second sub-pixel electrode 191b may be each connected to a second reference voltage line 131b associated with an adjacent pixel to receive the second voltage.

The first sub-pixel electrode 191a overlaps at least a portion of the two first vertical portions 133a1 of the first reference voltage line 131a, and the two first vertical portions 133a1 of the first reference voltage line 131a are respectively disposed at the left side and the right side of the first sub-pixel electrode 191a. The two first vertical portions 133a1 of the first reference voltage line 131a may have substantially equal lengths and substantially equal widths.

The first sub-pixel electrode 191a overlaps at least a portion of the two second vertical portions 133b1 of the second reference voltage line 131b, and the two second vertical portions 133b1 of the second reference voltage line 131b are respectively disposed at the left side and the right side of the first sub-pixel electrode 191a. The two second vertical portions 133b1 of the second reference voltage line 131b may have substantially equal lengths and substantially equal widths.

The second sub-pixel electrode 191b overlaps at least a portion of the two third vertical portions 133a2 of the first reference voltage line 131a. The two third vertical portions 133a2 of the first reference voltage line 131a are respectively disposed at the left side and the right side of the first sub-pixel electrode 191a. The two third vertical portions 133a2 of the first reference voltage line 131a may have substantially equal lengths and substantially equal widths.

The second sub-pixel electrode 191b overlaps at least a portion of the two fourth vertical portions 133b2 of the second reference voltage line 131b. The two fourth vertical portions 133b2 of the second reference voltage line 131b are respectively disposed at the left side and the right side of the first sub-pixel electrode 191a. The two fourth vertical portions 133b2 of the second reference voltage line 131b may have substantially equal lengths and substantially equal widths.

Two vertical portions of the first reference voltage line 131a are respectively disposed at the left side and the right side of the first sub-pixel electrode 191a, and two vertical portions of the second reference voltage line 131b are respectively disposed at the left side and the right side of the first sub-pixel electrode 191a. Accordingly, even if misalignment occurs at the left side or the right side of the first sub-pixel electrode 191a, the overlapping area of the first sub-pixel electrode 191a and the first vertical portions 133a1 of the first reference voltage line 131a may be substantially constant, and the overlapping area of the first sub-pixel electrode 191a and the second vertical portions 133b1 of the second reference voltage line 131b may be substantially constant.

Therefore, a potential substantial change in voltage of the first sub-pixel electrode 191a caused by a substantial change in overlapping area of the first sub-pixel electrode 191a and either of the first reference voltage line 131a and the second reference voltage line 131b may be prevented.

Analogously, two vertical portions of the first reference voltage line 131a are respectively disposed at the left side and the right side of the second sub-pixel electrode 191b, and two vertical portions of the second reference voltage line 131b are respectively disposed at the left side and the right side of the second sub-pixel electrode 191b. Accordingly, even if misalignment occurs at the left side or the right side of the second sub-pixel electrode 191b, the overlapping area of the second sub-pixel electrode 191b and the third vertical portion 132b1 of the first reference voltage line 131a may be substantially constant, and the overlapping area of the second sub-pixel electrode 191b and the fourth vertical portion 133b2 of the second reference voltage line 131b may be substantially constant.

Therefore, a potential substantial change in voltage of the second sub-pixel electrode 191b caused by a substantial change in overlapping area of the second sub-pixel electrode 191b and either of the first reference voltage line 131a and the second reference voltage line 131b may be prevented.

According to one or more embodiments of the present invention, since portions of the first reference voltage line 131a and portions of the second reference voltage line 131b are disposed at the left side and the right side of each of the sub-pixel electrodes 191a and 191b, even if misalignment occurs at the left side or the right side of each of the sub-pixel electrodes 191a and 191b, the overlapping areas of each of the sub-pixel electrodes 191a and 191b and each of the first reference voltage line 131a and the second reference voltage line 131b may remain substantially constant.

Therefore, a potential substantial change in voltage of the first sub-pixel electrode 191a caused by a substantial change in overlapping area of the first sub-pixel electrode 191a and the first reference voltage line 131a and the second reference voltage line 131b may be prevented.

One or more features and advantages of the liquid crystal display described with reference to FIGS. 1 to 6 can be applied to the liquid crystal display described with reference to FIG. 7.

Figure 8:
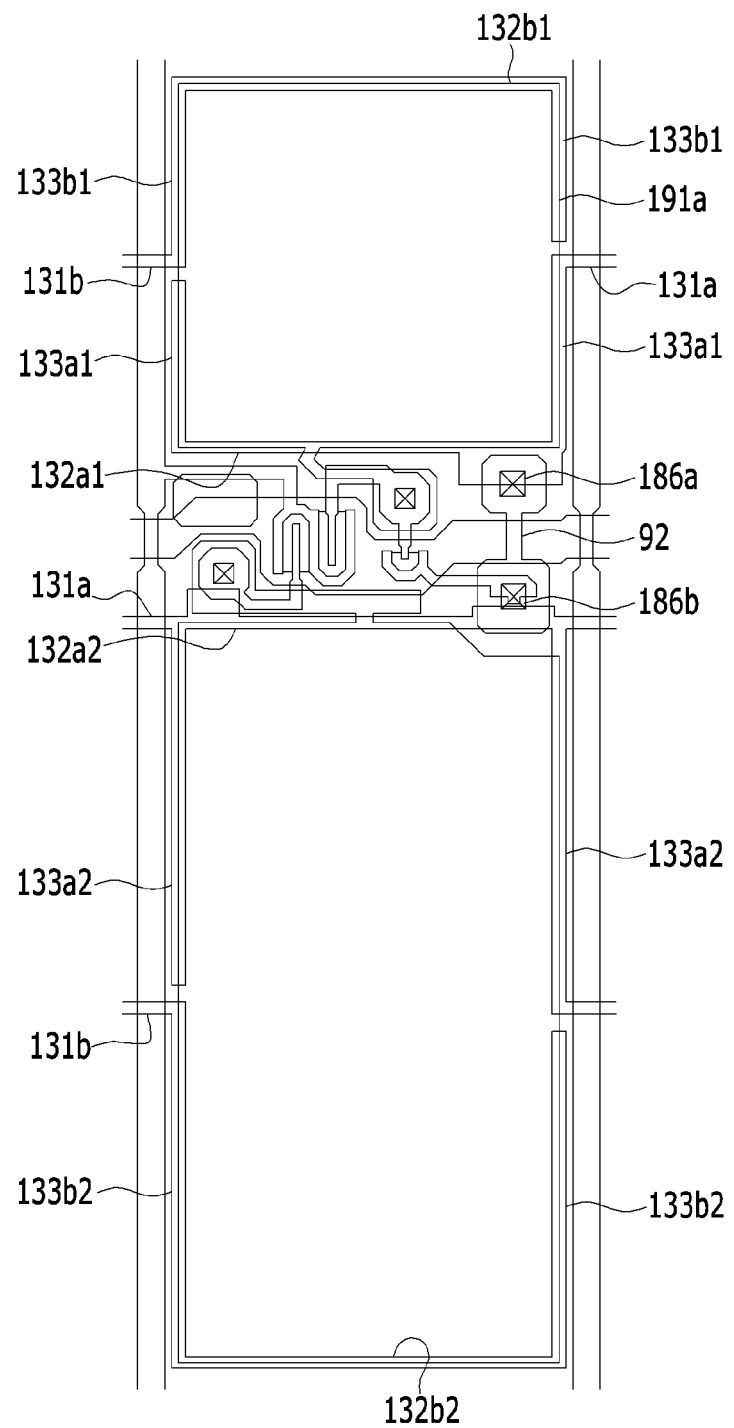
FIG. 8 is a layout view (or plan view) illustrating a liquid crystal display according to one or more embodiments of the present invention.

FIG. 8 is a layout view (or plan view) illustrating a liquid crystal display according to one or more embodiments of the present invention.

The liquid crystal display illustrated in FIG. 8 may include elements that are analogous to or identical to elements of the liquid crystal display described with reference to one or more of FIGS. 2 and 7. Detailed description regarding some of the analogous or identical elements may be omitted.

Referring to FIG. 8, in the liquid crystal display, a first reference voltage line 131a includes a first horizontal portion 132a1 that is parallel to (and partially overlaps) a lower side edge of a first sub-pixel electrode 191a, two first vertical portions 133a1 respectively extending from the first horizontal portion 132a1 along (and respectively partially overlapping) left side and right side edges of the first sub-pixel electrode 191a, a third horizontal portion 132a2 that is parallel to (and partially overlaps) an upper side edge of a second sub-pixel electrode 191b, and two third vertical portions 133a2 respectively extending from the third horizontal portion 132a2 along (and respectively partially overlapping) left side and right side edges of the second sub-pixel electrode 191b. Herein the terms "horizontal", "vertical", "upper" and "lower" are provided in view of a standing position of the liquid crystal display.

The first horizontal portion 132a1 that is parallel to the lower side edge of the first sub-pixel electrode 191a may be connected to a first reference voltage line 131a associated with a pixel disposed at the right side of the first sub-pixel electrode 191a, and the third horizontal portion 132a2 that is parallel to the upper side edge of the second sub-pixel electrode 191b may be connected to the first reference voltage line 131a associated with the pixel disposed at the right side of the second sub-pixel electrode 191b to receive a first voltage.

Analogously, the second reference voltage line 131b includes a second horizontal portion 132b1 that is parallel to (and partially overlaps) the upper side edge of the first sub-pixel electrode 191a, two second vertical portions 133b1 respectively extending from the second horizontal portion 132b1 along (and respectively partially overlapping) the left side and right side edges of the first sub-pixel electrode 191a, a fourth horizontal portion 132b2 that is parallel to (and partially overlaps) the lower side edge of the second sub-pixel electrode 191b, and two fourth vertical portions 133b2 respectively extending from the fourth horizontal portion 132b2 along (and respectively partially overlapping) the left side and right side edges of the second sub-pixel electrode 191b.

The second horizontal portion 132b1 that is parallel to the upper side edge of the first sub-pixel electrode 191a may be connected to a second reference voltage line 131b associated with a pixel disposed at the left side of the first sub-pixel electrode 191a, and the fourth horizontal portion 133b2 that is parallel to the lower side edge of the second sub-pixel electrode 191b may be connected to the second reference voltage line 131b associated with the pixel disposed at the left side of the second sub-pixel electrode 191b to receive a second voltage.

The first sub-pixel electrode 191a overlaps at least a portion of the two first vertical portions 133a1 of the first reference voltage line 131a, and the two first vertical portions 133a1 of the first reference voltage line 131a are respectively disposed at the left side and the right side of the first sub-pixel electrode 191a. The two first vertical portions 133a1 of the first reference voltage line 131a may have substantially equal lengths and substantially equal widths.

The first sub-pixel electrode 191a overlaps at least a portion of the two second vertical portions 133b1 of the second reference voltage line 131b, and the two second vertical portions 133b1 of the second reference voltage line 131b are respectively disposed at the left side and the right side of the first sub-pixel electrode 191a. The two second vertical portions 133b1 of the second reference voltage line 131b may have substantially equal lengths and substantially equal widths.

The second sub-pixel electrode 191b overlaps at least a portion of the two third vertical portions 133a2 of the first reference voltage line 131a. The two third vertical portions 133a2 of the first reference voltage line 131a are respectively disposed at the left side and the right side of the first sub-pixel electrode 191a. The two third vertical portions 133a2 of the first reference voltage line 131a may have substantially equal lengths and substantially equal widths.

The second sub-pixel electrode 191b overlaps at least a portion of the two fourth vertical portions 133b2 of the second reference voltage line 131b. The two fourth vertical portions 133b2 of the second reference voltage line 131b are respectively disposed at the left side and the right side of the first sub-pixel electrode 191a. The two fourth vertical portions 133b2 of the second reference voltage line 131b may have substantially equal lengths and substantially equal widths.

Two vertical portions of the first reference voltage line 131a are respectively disposed at the left side and the right side of the first sub-pixel electrode 191a, and two vertical portions of the second reference voltage line 131b are respectively disposed at the left side and the right side of the first sub-pixel electrode 191a. Accordingly, even if misalignment occurs at the left side or the right side of the first sub-pixel electrode 191a, the overlapping area of the first sub-pixel electrode 191a and the first vertical portion 133a1 of the first reference voltage line 131a may be substantially constant, and the overlapping area of the first sub-pixel electrode 191a and the second vertical portion 133b1 of the second reference voltage line 131b may be substantially constant.

Therefore, a potential substantial change in voltage of the first sub-pixel electrode 191a caused by a substantial change in overlapping area of the first sub-pixel electrode 191a and either of the first reference voltage line 131a and the second reference voltage line 131b may be prevented.

Analogously, two vertical portions of the first reference voltage line 131a are respectively disposed at the left side and the right side of the second sub-pixel electrode 191b, and two vertical portions of the second reference voltage line 131b are respectively disposed at the left side and the right side of the second sub-pixel electrode 191b. Accordingly, even if misalignment occurs at the left side or the right side of the second sub-pixel electrode 191b, the overlapping area of the second sub-pixel electrode 191b and the third vertical portion 132b1 of the first reference voltage line 131a may be substantially constant, and the overlapping area of the second sub-pixel electrode 191b and the fourth vertical portion 133b2 of the second reference voltage line 131b may be substantially constant.

Therefore, a potential substantial change in voltage of the second sub-pixel electrode 191b caused by a substantial change in overlapping area of the second sub-pixel electrode 191b and either of the first reference voltage line 131a and the second reference voltage line 131b may be prevented.

According to one or more embodiments of the present invention, since portions of the first reference voltage line 131a and portions of the second reference voltage line 131b are disposed at the left side and the right side of each of the sub-pixel electrodes 191a and 191b, even if misalignment occurs at the left side or the right side of each of the sub-pixel electrodes 191a and 191b, the overlapping areas of each of the sub-pixel electrodes 191a and 191b and each of the first reference voltage line 131a and the second reference voltage line 131b may remain substantially constant.

Therefore, a potential substantial change in voltage of the first sub-pixel electrode 191a caused by a substantial change in overlapping area of the first sub-pixel electrode 191a and the first reference voltage line 131a and the second reference voltage line 131b may be prevented.

One or more features and advantages of the liquid crystal display(s) described with reference to FIGS. 1 to 6 and FIG. 7 can be applied to the liquid crystal display described with reference to FIG. 8.

Figure 9:
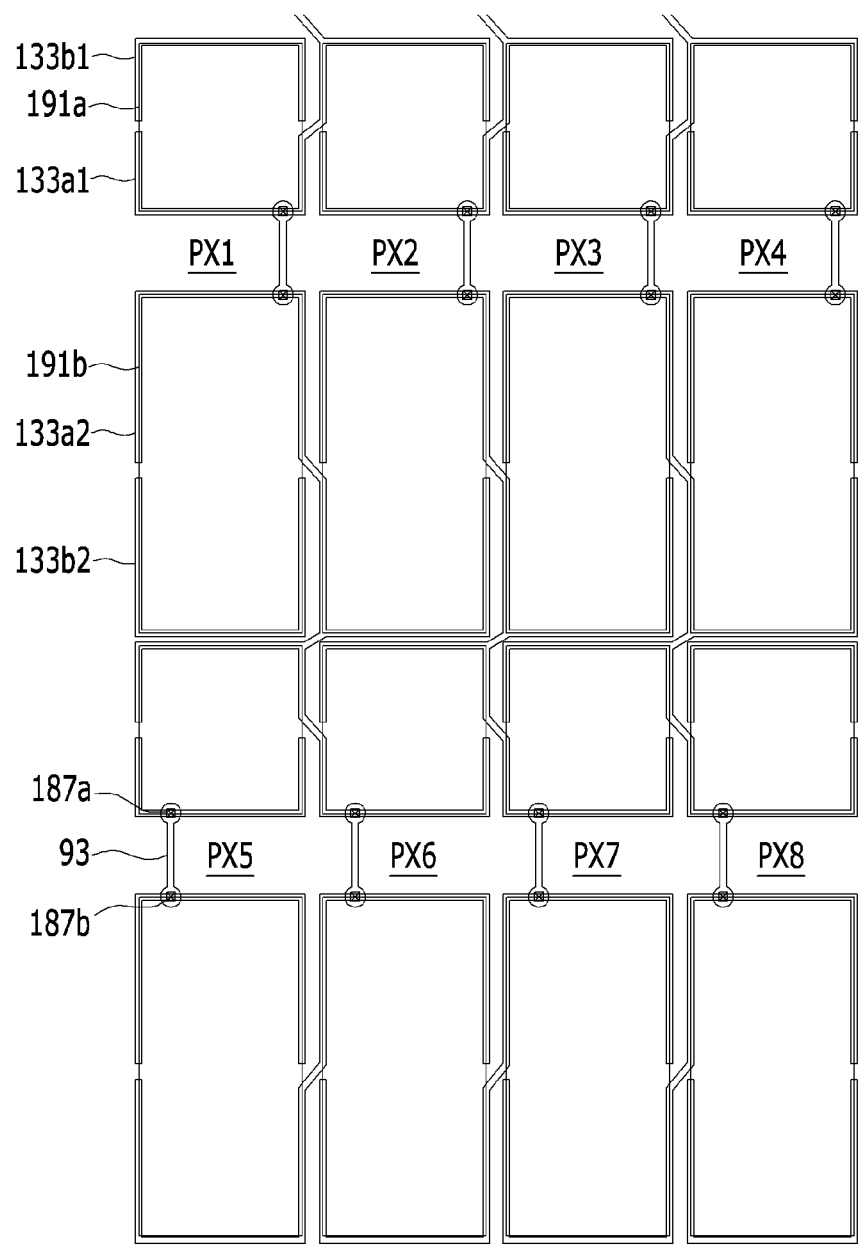
FIG. 9 is a layout view (or plan view) illustrating a configuration of voltage applying lines and pixel electrodes of a liquid crystal display according to one or more embodiments of the present invention.
Figure 10:
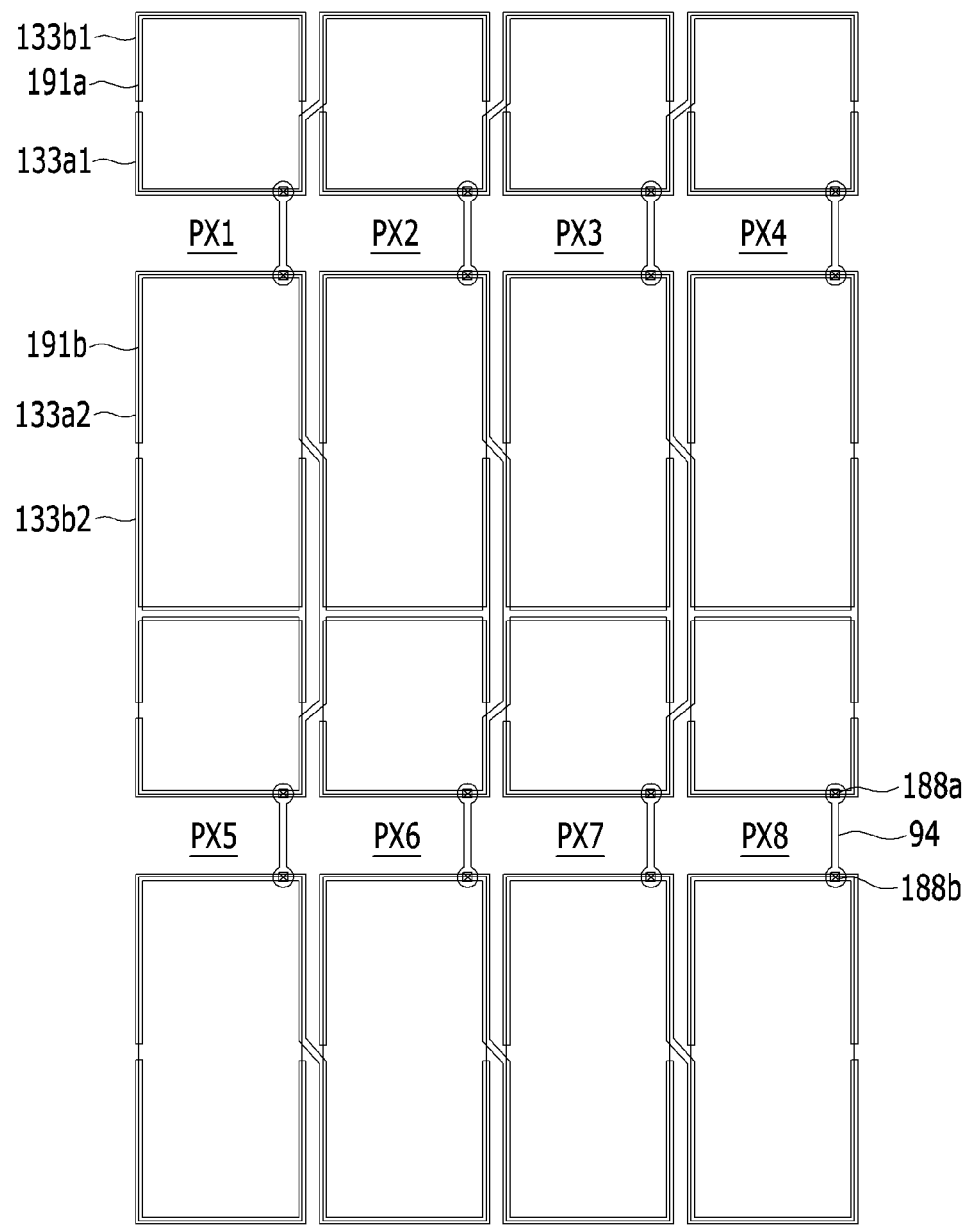
FIG. 10 is a layout view (or plan view) illustrating a configuration of voltage applying lines and pixel electrodes of a liquid crystal display according to one or more embodiments of the present invention.

FIG. 9 is a layout view (or plan view) illustrating a configuration of voltage applying lines and pixel electrodes of a liquid crystal display (e.g., the liquid crystal display discussed with reference to FIG. 7 or FIG. 8) according to one or more embodiments of the present invention. FIG. 10 is a layout view (or plan view) illustrating a configuration of voltage applying lines and pixel electrodes of a liquid crystal display (e.g., the liquid crystal display discussed with reference to FIG. 7 or FIG. 8) according to one or more embodiments of the present invention.

Referring to FIGS. 9 and 10, the first reference voltage lines 131a overlapping the pixel electrodes 191 disposed in two pixel columns (e.g., pixel electrodes of two of pixels PX1, PX2, PX3, PX4, PX5, PX6, PX7, and PX8 disposed in two immediately neighboring pixel columns) are connected to each other. A horizontal portion (e.g., 132a1) of a first reference voltage line 131a that overlaps the first sub-pixel electrode 191a of a pixel electrode 191 may be connected to a horizontal portion (e.g., 132a2) of the first reference voltage line 131a that overlaps the second sub-pixel electrode 191b of the pixel electrode 191 through a second connecting member 93. The second connecting member 93 may be connected to the two horizontal portions of the first reference voltage line 131a through two second contact holes 187a and 187b, respectively. Additionally or alternatively, the second reference voltage lines 131b overlapping the pixel electrodes 191 disposed in two pixel columns (e.g., pixel electrodes of two of pixels PX1 to PX8 disposed in two immediately neighboring pixel columns) are connected to each other. A horizontal portion (e.g., 132b1) of a second reference voltage line 131b that overlaps the first sub-pixel electrode 191a of a pixel electrode 191 may be connected to a horizontal portion (e.g., 132b2) of the second reference voltage line 131b that overlaps the second sub-pixel electrode 191b of the pixel electrode 191 through a third connecting member 94. The third connecting member 94 may be connected to the two horizontal portions of the second reference voltage line 131b through two third contact holes 188a and 188b, respectively.

One pair of second contact holes 187a and 187b and one second connecting member 93 may be used for connecting portions of a first reference voltage lines 131a that overlap two immediately neighboring pixel electrodes that are disposed in two immediately adjacent pixel columns. One pair of third contact holes 188a and 188b and one third connecting member 94 may be used for connecting portions of a second reference voltage lines 131b that overlap two immediately neighboring pixel electrodes that are disposed in two immediately adjacent pixel columns.

Figure 11:
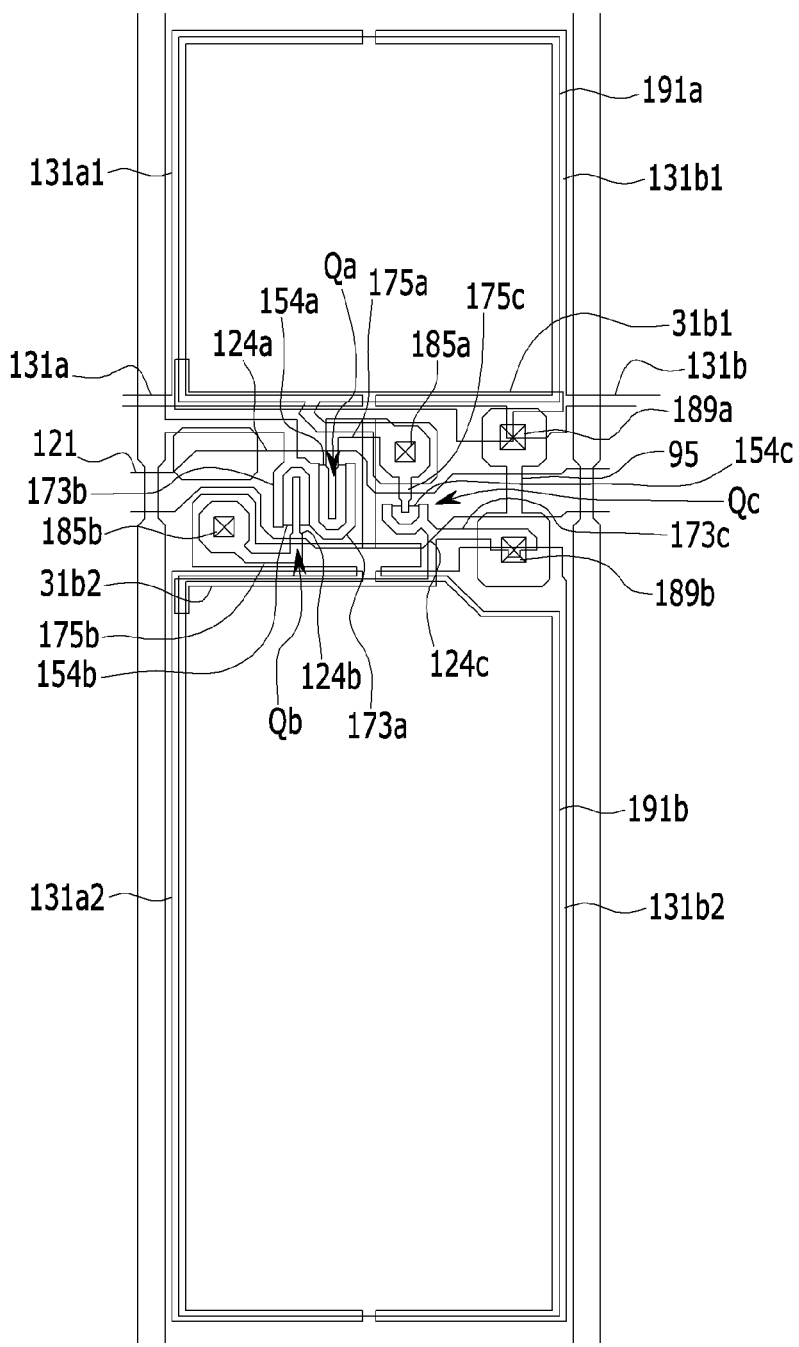
FIG. 11 is a layout view (or plan view) illustrating a liquid crystal display according to one or more embodiments of the present invention.

FIG. 11 is a layout view (or plan view) illustrating a liquid crystal display according to one or more embodiments of the present invention.

The liquid crystal display illustrated in FIG. 11 may include elements that are analogous to or identical to elements of the liquid crystal display discussed with reference one or more of FIGS. 2, 7, and 8. Detailed description regarding some of the analogous or identical elements may be omitted.

Referring to FIG. 11, in the liquid crystal display, a first reference voltage line 131a includes a first portion 131a1 formed to (partially) overlap the left side edge of the first sub-pixel electrode 191a and to (partially) overlap substantially a half of each of the upper side and the lower side of the first sub-pixel electrode 191a; the first reference voltage line 131a may further include a second portion 131a2 formed to (partially) overlap the left side edge of the second sub-pixel electrode 191b and to (partially) overlap substantially a half of each of the upper side and the lower side of the second sub-pixel electrode 191b. The first portion and the second portion may be connected to each other, the first portion and the second portion overlapping sub-pixel electrodes of a same pixel may be connected to each other, and the first portion and the second portion overlapping sub-pixel electrodes of immediately adjacent pixels may be connected to each other.

A second reference voltage line 131b includes a third portion 131b1 formed to (partially) overlap the right side edge of the first sub-pixel electrode 191a and to (partially) overlap substantially a half of each of the upper side and lower side of the first sub-pixel electrode 191a; the second reference voltage line 131b may further include a fourth portion formed to (partially) overlap the right side edge of the second sub-pixel electrode 191b and to (partially) overlap substantially a half of each of the upper side and lower side of the second sub-pixel electrode 191b. The third portion and the fourth portion may be connected to each other, and the third portion and the fourth portion overlapping sub-pixel electrodes of a same pixel may be connected to each other. As illustrated in FIG. 11, the third portion 131b1 and the fourth portion 131b2 of the second reference voltage line 131b are respectively exposed through fourth contact holes 189a and 189b, and the third portion 131b1 and the fourth portion 131b2 of the second reference voltage line 131b exposed through the fourth contact holes 189a and 189b are connected to each other by a fourth connecting member 95.

In one or more embodiments, the liquid crystal display includes a first auxiliary member 31b1 and a second auxiliary member 31b2 respectively connected to the third portion 131b1 and the fourth portion 131b2 of the second reference voltage line 131b exposed through the fourth contact holes 189a and 189b.

The first auxiliary member 31a and the second auxiliary member 31b are formed of the same layer as the data line 171, the first auxiliary member 31b1 overlaps the first sub-pixel electrode 191a, and the second auxiliary member 31b2 overlaps the second sub-pixel electrode 191b.

Each of the first auxiliary member 31b1 and the second auxiliary member 31b2 may be disposed to overlap an edge of a horizontal direction of one of the first sub-pixel electrode 191a and the second sub-pixel electrode 191b to increase or reduce the overlapping area between the first sub-pixel electrode 191*a* and the first auxiliary member 31*b*1 and/or the overlapping area between the second sub-pixel electrode 191*b* and the second auxiliary member 31*b*2 when the overlapping area of the second reference voltage line 131*b*, the first sub-pixel electrode 191*a*, and the second sub-pixel electrode 191*b* is reduced or increased according to misalignment of the first sub-pixel electrode 191*a* and/or the second sub-pixel electrode 191*b*, for preventing a change in voltage of the first sub-pixel electrode 191*a* by preventing a change in overlapping area of the first sub-pixel electrode 191*a*, a wire to which the first reference voltage is applied, and a wire to which the second reference voltage is applied.

In one or more embodiments, the overlapping area of the first sub-pixel electrode 191*a* and the first reference voltage line 131*a* may be set to be substantially equal to the overlapping area of the first sub-pixel electrode 191*a*, the second reference voltage line 131*b*, and the first auxiliary member 31*b*1, for preventing a change in voltage of the first sub-pixel electrode 191*a* by preventing a change in overlapping area of the first sub-pixel electrode 191*a*, the wire to which the first reference voltage is applied, and the wire to which the second reference voltage is applied. Analogously, the overlapping area of the second sub-pixel electrode 191*b* and the first reference voltage line 131*a* may be set to be substantially equal to the overlapping area of the second sub-pixel electrode 191*b*, the second reference voltage line 131*b*, and the second auxiliary member 31*b*2, for preventing a change in voltage of the first sub-pixel electrode 191*a* by preventing a change in overlapping area of the second sub-pixel electrode 191*b*, the wire to which the first reference voltage is applied, and the wire to which the second reference voltage is applied.

One or more features and advantages of one or more of the liquid crystal displays described with reference to FIGS. 1 to 6, FIG. 7, and FIG. 8 can be applied to the liquid crystal display illustrated in FIG. 11.

In a liquid crystal display according to one or more embodiments of the present invention, even if a portion of the first reference voltage line and the second reference voltage line is misaligned at the left side and the right side of each sub-pixel electrode, the overlapping areas of each sub-pixel electrode and each of the first reference voltage line and the second reference voltage line may remain substantially constant. Therefore, there may be no substantial change in voltage of the pixel electrode caused by a substantial change in overlapping area of the pixel electrode and either of the first reference voltage line and the second reference voltage line.

A liquid crystal display according to one or more embodiments of the present invention can adjust the voltage charged to a first sub-pixel electrode to be higher than a data voltage by applying a reference voltage to the first sub-pixel electrode. Accordingly, a grayscale in a low gray region can be suitably adjusted. Advantageously, a suitable grayscale and luminance in the low gray region may be provided, and lateral surface visibility may approximate front surface visibility, such a user of the liquid crystal display may perceive satisfactory image quality.

While this invention has been described in connection with what is presently considered to be practical embodiments, it is to be understood that the invention is not limited to the disclosed embodiments. The invention is intended to cover various modifications and equivalent arrangements included within the spirit and scope of the appended claims.

What is claimed is:

1. A liquid crystal display comprising:
   a first substrate;
   a first gate line disposed on the first substrate;
   a data line disposed on the first substrate;
   a first reference voltage line disposed on the first substrate, including a first horizontal portion and two first vertical portions connected to the first horizontal portion, and applying a first voltage;
   a second reference voltage line disposed on the first substrate, including a second horizontal portion and two second vertical portions connected to the second horizontal portion, and applying a second voltage;
   a first sub-pixel electrode and a second sub-pixel electrode disposed in one pixel region, wherein the first sub-pixel electrode overlaps both the first reference voltage line and the second reference voltage line;
   a first switching element connected to the first gate line, the data line, and the first sub-pixel electrode;
   a second switching element connected to the first gate line, the data line, and the second sub-pixel electrode; and
   a third switching element connected to any one of the first gate line, the first reference voltage line, and the second reference voltage line, and the first sub-pixel electrode,
   wherein the two first vertical portions are disposed to be adjacent to both edges of the first sub-pixel electrode, the two second vertical portions are disposed to be adjacent to both edges of the first sub-pixel electrode, and the first vertical portions and the second vertical portions are spaced apart from each other.

2. The liquid crystal display of claim 1, wherein:
   overlapping areas of the first sub-pixel electrode and the first vertical portions are almost the same as overlapping areas of the first sub-pixel electrode and the second vertical portions.

3. The liquid crystal display of claim 2, wherein:
   the first reference voltage line further includes two third vertical portions disposed to be adjacent to both edges of the second sub-pixel electrode, and
   the second reference voltage line further includes two fourth vertical portions disposed to be adjacent to both edges of the second sub-pixel electrode.

4. The liquid crystal display of claim 3, wherein:
   overlapping areas of the first sub-pixel electrode and the third vertical portions are almost the same as overlapping areas of the second sub-pixel electrode and the fourth vertical portions.

5. The liquid crystal display of claim 4, wherein:
   the first horizontal portion is disposed to be adjacent to a horizontal central portion of the first sub-pixel electrode, or disposed to be adjacent to an upper edge or a lower edge of the first sub-pixel electrode.

6. The liquid crystal display of claim 5, wherein:
   the second horizontal portion is disposed to be adjacent to the upper edge or the lower edge of the first sub-pixel electrode, or disposed to be adjacent to the horizontal central portion of the first sub-pixel electrode.

7. The liquid crystal display of claim 6, wherein:
   the first reference voltage line includes a third horizontal portion connecting the two third vertical portions, and
   the third horizontal portion is disposed to be adjacent to a horizontal central portion of the second sub-pixel electrode, or disposed to be adjacent to an upper edge or a lower edge of the second sub-pixel electrode.

8. The liquid crystal display of claim 7, wherein:
   the second reference voltage line includes a fourth horizontal portion connecting the two fourth vertical portions, and the fourth horizontal portion is disposed to be adjacent to the upper edge or the lower edge of the second sub-pixel electrode, or disposed to be adjacent to the horizontal central portion of the second sub-pixel electrode.

9. The liquid crystal display of claim 8, wherein:
an overlapping area of the first sub-pixel electrode and the first horizontal portion is almost the same as an overlapping area of the first sub-pixel electrode and the second horizontal portion, and
an overlapping area of the second sub-pixel electrode and the third horizontal portion is almost the same as an overlapping area of the second sub-pixel electrode and the fourth horizontal portion.

10. The liquid crystal display of claim 2, wherein:
the first horizontal portion is disposed to be adjacent to a horizontal central portion of the first sub-pixel electrode, or disposed to be adjacent to an upper edge or a lower edge of the first sub-pixel electrode.

11. The liquid crystal display of claim 10, wherein:
the second horizontal portion is disposed to be adjacent to the upper edge or the lower edge of the first sub-pixel electrode, or disposed to be adjacent to the horizontal central portion of the first sub-pixel electrode.

12. The liquid crystal display of claim 11, wherein:
an overlapping area of the first sub-pixel electrode and the first horizontal portion is almost the same as an overlapping area of the first sub-pixel electrode and the second horizontal portion.

13. The liquid crystal display of claim 2, wherein:
a data voltage applied to the data line, and a first voltage or a second voltage applied to any one of the first reference voltage line and the second reference voltage line connected to the third switching element have the same polarity to a common voltage.

14. The liquid crystal display of claim 13, wherein:
the first voltage or the second voltage has a predetermined magnitude and polarity changed for each frame.

15. The liquid crystal display of claim 14, wherein:
a voltage difference between the first sub-pixel electrode and a common electrode is larger than the voltage difference between the second sub-pixel electrode and the common electrode.

16. The liquid crystal display of claim 1, wherein:
a data voltage applied to the data line, and a first voltage or a second voltage applied to any one of the first reference voltage line and the second reference voltage line connected to the third switching element have the same polarity to a common voltage.

17. The liquid crystal display of claim 16, wherein:
the first voltage or the second voltage has a predetermined magnitude and the polarity changed for each frame.

18. The liquid crystal display of claim 17, wherein:
a voltage difference between the first sub-pixel electrode and a common electrode is larger than the voltage difference between the second sub-pixel electrode and the common electrode.

* * * * *